US011012573B2

(12) United States Patent
Hartman et al.

(10) Patent No.: US 11,012,573 B2
(45) Date of Patent: *May 18, 2021

(54) INTERACTIVE VOICE RESPONSE USING A CLOUD-BASED SERVICE

(71) Applicant: Amazon Technologies, Inc., Seattle, WA (US)

(72) Inventors: John Michael Hartman, Ottawa (CA); Michael Frederick Kahn, Arnprior (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,346

(22) Filed: Oct. 11, 2019

(65) Prior Publication Data

US 2020/0045178 A1 Feb. 6, 2020

Related U.S. Application Data

(63) Continuation of application No. 15/598,177, filed on May 17, 2017, now Pat. No. 10,447,860.

(51) Int. Cl.
*H04M 3/527* (2006.01)
*H04M 7/00* (2006.01)

(52) U.S. Cl.
CPC .......... *H04M 3/527* (2013.01); *H04M 7/006* (2013.01); *H04M 2201/39* (2013.01); *H04M 2201/40* (2013.01)

(58) Field of Classification Search
CPC .. H04M 3/493; H04M 3/4938; H04M 3/4936; H04M 2203/254;
(Continued)

(56) References Cited

U.S. PATENT DOCUMENTS 6,496,691 B1 * 12/2002 Easley .............. H04M 3/42195
455/415
7,065,188 B1 * 6/2006 Mei ....................... H04M 3/493
379/88.23
(Continued)

OTHER PUBLICATIONS

Grant Clouser, "What Is Alexa? What Is the Amazon Echo, and Should You Get One?", TheWirecutter.com, Feb. 10, 2017, Retrieved from: http://thewirecutter.com/reviews/what-is-alexa-what-is-the-amazon-echo-and-should-you-get-one/, pp. 1-18.
(Continued)

*Primary Examiner* — Akelaw Teshale
(74) *Attorney, Agent, or Firm* — Robert C. Kowert; Kowert, Hood, Munyon, Rankin & Goetzel, P.C.

(57) ABSTRACT

Methods, systems, and computer-readable media for interactive voice response using a cloud-based service are disclosed. Voice input indicating interaction with an entity is received at a service provider environment. The entity is associated with an IVR data structure comprising one or more options associated with contacting the entity. The IVR data structure is selected based (at least in part) on analysis of the voice input by the service provider environment. The voice input is sent from a voice-capturing device to the service provider environment via a non-telephonic network. A contact point is selected from the IVR data structure based (at least in part) on analysis of the voice input and/or contextual information. A connection is initiated with the contact point.

20 Claims, 12 Drawing Sheets

(58) Field of Classification Search
CPC ........... H04M 2203/355; H04M 7/006; H04M 2203/558; H04M 1/271; H04M 1/72522; H04M 1/2535; H04M 2201/40; H04M 2203/252; H04M 7/0057; H04M 3/527; H04M 2201/39; H04M 3/4217

See application file for complete search history.

(56) References Cited

U.S. PATENT DOCUMENTS

| | | | | |
|---|---|---|---|---|
| 7,139,717 | B1* | 11/2006 | Abella | G10L 15/1822 |
| | | | | 704/275 |
| 8,345,835 | B1* | 1/2013 | Or-Bach | G06Q 30/0269 |
| | | | | 379/88.23 |
| 8,515,843 | B1 | 8/2013 | Sah et al. | |
| 8,655,761 | B2 | 2/2014 | Sah et al. | |
| 8,929,517 | B1* | 1/2015 | Lavian | H04M 3/493 |
| | | | | 379/88.11 |
| 9,100,478 | B1* | 8/2015 | Benway | H04M 3/493 |
| 9,148,512 | B1* | 9/2015 | Kumar | H04M 3/5166 |
| 9,210,274 | B2 | 12/2015 | Simoes et al. | |
| 9,258,417 | B2 | 2/2016 | Krieg | |
| 9,288,320 | B2 | 3/2016 | Springer | |
| 9,307,080 | B1* | 4/2016 | Fernandez | H04L 67/1012 |
| 9,325,847 | B2 | 4/2016 | Ma et al. | |
| 9,369,579 | B2 | 6/2016 | Awad et al. | |
| 9,380,160 | B2 | 6/2016 | Jain | |
| 9,401,993 | B1* | 7/2016 | van Rensburg | H04M 3/493 |
| 9,420,097 | B2* | 8/2016 | Perotti | H04M 3/493 |
| 9,420,098 | B2 | 8/2016 | Erel et al. | |
| 9,472,185 | B1* | 10/2016 | Yeracaris | G10L 15/063 |
| 9,479,644 | B1 | 10/2016 | Varman et al. | |
| 9,520,250 | B2 | 12/2016 | O'Keeffe | |
| 9,591,136 | B1 | 3/2017 | Garcia et al. | |
| 10,447,860 | B1 | 10/2019 | Hartman et al. | |
| 2003/0105634 | A1* | 6/2003 | Abella | H04M 3/4936 |
| | | | | 704/257 |
| 2004/0017898 | A1* | 1/2004 | Reynolds | H04M 1/271 |
| | | | | 379/88.18 |
| 2004/0193403 | A1* | 9/2004 | Creamer | G10L 15/1815 |
| | | | | 704/201 |
| 2005/0265524 | A1* | 12/2005 | Vollkommer | H04M 1/72522 |
| | | | | 379/88.1 |
| 2007/0263796 | A1* | 11/2007 | Patel | H04M 3/493 |
| | | | | 379/88.01 |
| 2008/0184106 | A1* | 7/2008 | Tischer | G06F 16/9027 |
| | | | | 715/241 |
| 2013/0038519 | A1* | 2/2013 | Bi | G06Q 30/0281 |
| | | | | 345/156 |
| 2013/0272511 | A1* | 10/2013 | Bouzid | G06F 8/38 |
| | | | | 379/88.01 |
| 2014/0036023 | A1* | 2/2014 | Croen | H04N 7/147 |
| | | | | 348/14.01 |
| 2015/0172463 | A1 | 6/2015 | Quast et al. | |
| 2015/0215455 | A1* | 7/2015 | Perotti | H04M 3/493 |
| | | | | 379/88.01 |
| 2015/0350427 | A1* | 12/2015 | Benway | H04M 3/493 |
| | | | | 379/88.01 |
| 2016/0080428 | A1* | 3/2016 | Fan | H04M 3/493 |
| | | | | 709/228 |
| 2016/0227034 | A1* | 8/2016 | Kulkarni | G10L 15/22 |
| 2016/0284207 | A1 | 9/2016 | Hou et al. | |
| 2016/0309246 | A1 | 10/2016 | O'Keeffe | |
| 2016/0349935 | A1 | 12/2016 | Gelfenbeyn et al. | |
| 2017/0040018 | A1 | 2/2017 | Tormey | |
| 2017/0055126 | A1 | 2/2017 | O'Keeffe | |
| 2017/0289332 | A1* | 10/2017 | Lavian | H04M 3/4938 |
| 2017/0374198 | A1* | 12/2017 | de Silva | H04L 51/02 |
| 2018/0018969 | A1* | 1/2018 | Bentitou | G10L 15/22 |
| 2018/0020093 | A1* | 1/2018 | Bentitou | G10L 13/00 |

OTHER PUBLICATIONS

"Voice Extensible Markup Language (VoiceXML) Version 2.0", Mar. 2004, Retrieved from URL: https://www.w3.org/TR/voicexml20/ on Mar. 23, 2017, pp. 1-140.

Paul Hallett, "Build an IVR System with Twilio and Django", Twilio Cloud Communications Blog, Jul. 2014, Retrieved from URL: https://www.twilio.com/blog/2014/07/build-an-ivr-system-with-twilio-and-django.html, pp. 1-14.

* cited by examiner

INTERACTIVE VOICE RESPONSE USING A CLOUD-BASED SERVICE

This application is a continuation of U.S. patent application Ser. No. 15/598,177, filed May 17, 2017, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Such services may be said to reside "in the cloud." The types of devices that can access cloud-based services continue to expand and diversify, including, for example, desktop computing devices, mobile devices such as smartphones and tablets, voice-capturing devices, home automation devices, and various other types of network-capable devices that are part of the "Internet of Things (IoT)." By accessing cloud-based services, a diverse universe of devices may access additional functionality or computing power not available locally on the devices.

Figure 1:
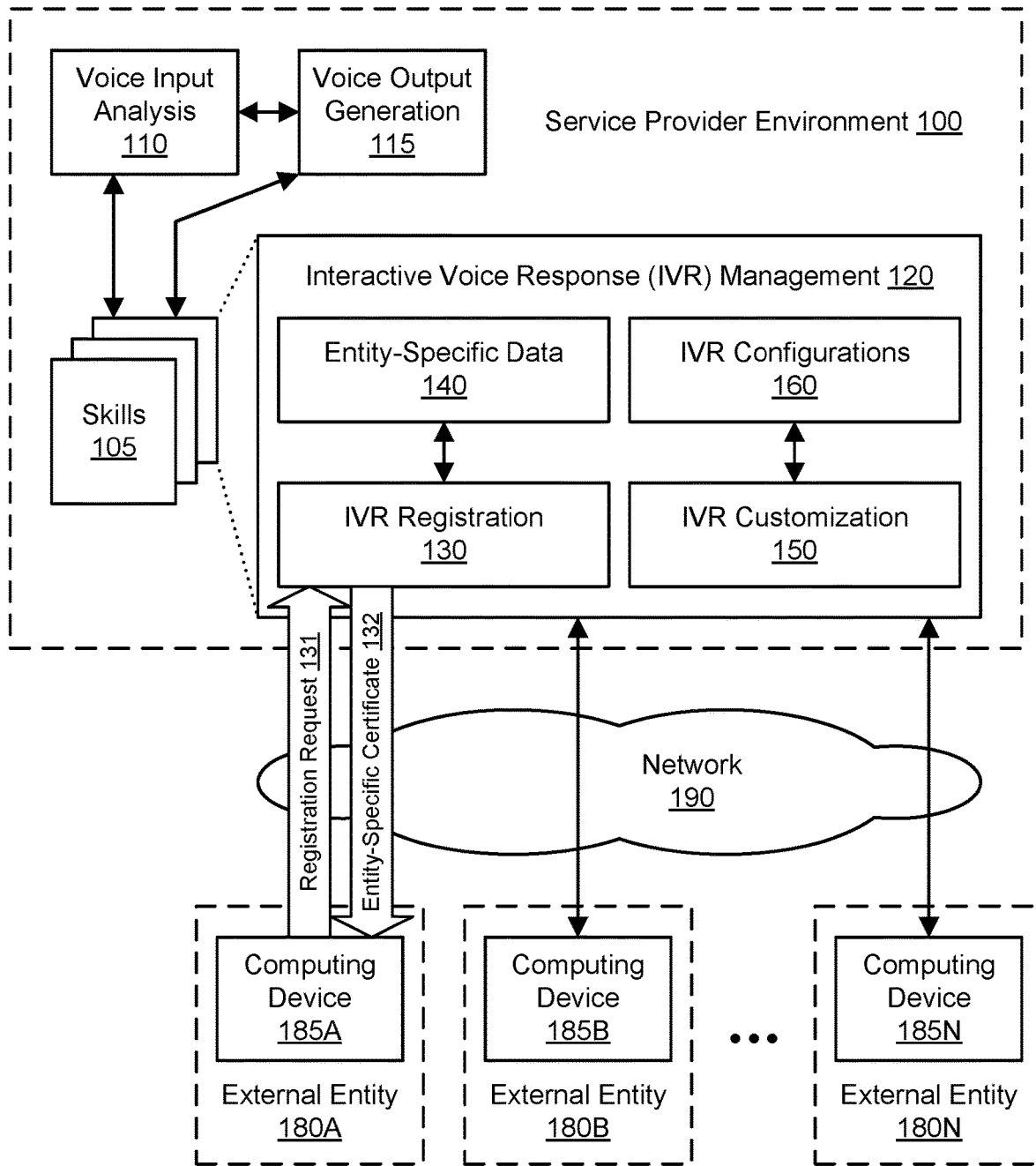
FIG. 1 illustrates an example system environment for interactive voice response using a voice-enabled service, including registration by an entity with an interactive voice response (IVR) management component of a service provider environment, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for interactive voice response using a voice-enabled service are disclosed. In a cloud-based service provider environment, one or more voice-enabled services may provide functionality for voice-capturing devices. Suitable devices may include desktop and laptop computing devices, smartphones, tablets, smart speakers, smart televisions, home automation devices, and/or other "Internet of Things" (IoT) devices. Via a non-telephonic network such as the Internet, a voice-capturing device may send voice input to the service provider environment and receive voice output to be played back on the device. The service provider environment may analyze the voice input (e.g., performing speech-to-text operations) and may invoke functionalities referred to as "skills" based on the content of the voice input. Using the techniques described herein, interactive voice response (IVR) solutions, such as those encountered during a typical customer service call on a telephone, may be implemented in the service provider environment for use with voice-capturing devices. IVR configurations may be customized by third-party, external entities (e.g., merchants, businesses, and other organizations) and deployed in the service provider environment. To set up navigable menu options for IVR, an entity may modify a default IVR configuration or provide an existing IVR configuration (e.g., in a format such as VoiceXML or JSON) for conversion to an IVR data structure used by the service provider environment. When voice input is received that represents a request to contact one of the entities, the service provider environment may select the appropriate entity-specific IVR data structure (e.g., an IVR tree) and navigate the various menu options based on further voice input. Navigation of the IVR configuration may include collection of relevant information without necessarily acquiring new input from the user, such as retrieving a previously determined language preference or an order history before navigating based on voice input acquired in real time. The IVR configuration for an entity may include contact points for the entity, such as phone numbers of customer service representatives and/or addresses of data stores. Navigation of the IVR configuration may result in the service provider environment brokering a phone call between the user and a particular phone number of the entity or retrieving data from a particular data source associated with the entity. In this manner, entities may easily delegate IVR navigation and information-gathering to a cloud-based, voice-enabled service while continuing to offer user-friendly telephonic service and support.

As an example, a merchant that typically takes orders over the telephone may supply alphanumeric input for a set of voice prompts and potential customer answers to those prompts. The voice prompts may relate to gathering information about a customer's identity and preferences for ordering, including the type of item the customer would like to order. When a customer asks to contact the merchant via voice input to a cloud-based, voice-enabled service, the cloud-based service may retrieve the merchant's configuration and begin traversing a hierarchy of voice prompts. In this manner, the cloud-based service may gather information from a customer using voice input transmitted over a non-telephonic connection to the cloud-based service. The cloud-based service may also gather information from existing sources, such as the customer's order history and preferences that were previously stored. After gathering information in this manner, the cloud-based service may then broker a phone call between the customer and a phone number associated with the merchant. The information gathered from the customer and/or from the other sources may be provided to the merchant in order to facilitate the phone call. The customer may then have a conversation with another person on the merchant's end to complete the order.

FIG. 1 illustrates an example system environment for interactive voice response using a voice-enabled service, including registration by an entity with an interactive voice response (IVR) management component of a service provider environment, according to one embodiment. A service provider environment 100 may include various components that are owned, operated, and/or managed by one or more organizations called service providers. The components of the service provider environment 100 may be located in one or more data centers and in one or more geographical locations. The service provider environment 100 may be implemented in "the cloud" and may be termed a cloud-based environment. The service provider environment 100 may include and/or provide access to a plurality of services or other components referred to as skills 105. The skills 105 may perform various functions or tasks, often involving interactions with voice-capturing devices outside the service provider environment 100. The skills 105 may also be referred to as functionalities. In various embodiments, some of the components of the service provider environment 100 may be accessed by or on behalf of voice-capturing devices, while others of the components may be accessed only by other components of the service provider environment and not directly by the devices. Services in the service provider environment 100 may be implemented according to a service-oriented architecture (SOA) in which services exchange requests and responses to perform complex operations. For example, the skills 105 may be implemented as services that interact with one or more voice-based services (or components) implementing voice input analysis 110 and voice output generation 115.

Voice-capturing devices may be configurable to access one or more resources and/or services provided by the cloud-based service provider environment 100. For example, a voice-capturing device may be capable of accessing or invoking particular skills 105 if the device is properly configured, e.g., by a device management component that maintains device-specific accounts with device-specific configuration information. In various embodiments, the devices that are served by the service provider environment may be heterogeneous or homogeneous in terms of their device type and/or vendor. The devices may include various types of electronic devices, digital devices, and/or computing devices. A device that connects to the voice-based service(s) of the service provider environment 100 may represent a smart speaker, smart television, or other type of home automation device or "Internet of Things" device. In one embodiment, the devices may include wireless and/or wired networking interfaces for accessing Wi-Fi and/or other suitable wireless and/or wired networks.

In one embodiment, the service provider environment 100 may include one or more network-accessible, voice-based services or components to implement voice input analysis 110 and voice output generation 115. Voice-capturing devices outside the environment 100 may send voice input to the network-accessible voice-based service provided by the service provider environment 100. The voice-based service(s) may analyze the voice input, e.g., using the voice input analysis 110 to perform speech-to-text transformation. In response, the voice-based service(s) may take one or more actions, such as invoking one or more of the skills 105, and/or stream voice output back to the originating device for playback on that device. To produce voice output, the voice-based service(s) may use the voice output generation 115 to perform text-to-speech transformation. The actions and/or voice output may vary based on the skills 105 of the service provider environment 100 that are enabled for the particular device. Skills or functionalities that are responsive to voice input from devices may be referred to as voice-enabled skills or voice-enabled functionalities. In various embodiments, the skills 105 provided by the service provider environment 100 may include, for example, acting as a scheduling assistant; accessing calendars, phone directories, or e-mail; creating, scheduling, and/or modifying tasks;

reciting financial data such as stock prices; placing a room service request at a hotel; playing music or other prerecorded audio; reciting a weather report; reciting a news report; purchasing goods or services from an online merchant; performing home automation tasks such as turning lights on or off; and so on. In one embodiment, some of the devices may be satellite devices such as smart remote controls that are configured to connect to a central device over a local area network, e.g., to send voice input to the central device, and the central device may then connect to the service provider environment 100. By accessing cloud-based, voice-enabled services of the service provider environment 100, the devices may access additional functionalities or other resources not available locally on the devices.

The service provider environment 100 may include an interactive voice response (IVR) management component 120 that performs automated management of IVR data and processes on behalf of external entities 180A-180N. Although three external entities 180A and 180B through 180N are shown for purposes of illustration and example, any suitable number and configuration of entities may interact with the service provider environment 100. The organization that operates the service provider environment 100 may differ from the entities 180A-180N, and thus the entities may be considered external to that environment. The external entities 180A-180N may represent third-party individuals, businesses, or other organizations who seek to delegate IVR operations to the service provider environment 100. For example, the external entities 180A-180N may include businesses and other organizations that seek to offer phone-based service or support to their customers (or potential customers) through IVR processes. As another example, the external entities 180A-180N may include individual merchants who offer goods and/or services through a common electronic marketplace that is open to many such merchants.

The IVR management component 120 may be considered a skill, in addition to the other skills 105. The IVR management component 120 may be considered a voice-enabled service, in addition to the other voice-enabled service(s) that implement voice input analysis 110 and voice output generation 115. In one embodiment, the IVR management component 120 may be accessed only on behalf of voice-capturing devices for which the component is enabled. The IVR management component 120 (or other skills 105) may be enabled for a particular device using a device-specific account managed in the service provider environment 100. In one embodiment, the IVR management component 120 may be enabled for a device or for a set of devices based (at least in part) on input from a user of the device, input from an administrator of the device, a default device configuration, and so on. In a similar manner, in one embodiment, IVR data and processes associated with a particular entity (e.g., a particular business) may be accessed only on behalf of voice-capturing devices for which the IVR data and processes are enabled. For example, a user of a voice-capturing device may speak a phrase such as "enable the [merchant name] skill" in order to access IVR navigation for that merchant. Such voice input may be sent from the voice-capturing device to the voice input analysis component 110 for analysis, the service provider environment 100 may perform a lookup for the merchant name to determine a relevant IVR configuration, and that IVR configuration for that merchant may then be enabled for that device based on the analysis. In one embodiment, IVR data and processes for all of the entities 180A-180N may be enabled by default for an account associated with a particular voice-capturing device. In one embodiment, the account associated with a particular voice-capturing device may be linked to a particular geographical region, and cloud-based IVR navigation may be enabled by default only for entities that operate within that region.

The various entities 180A-180N may operate or otherwise be associated with computing devices. As shown in the example of FIG. 1, the entity 180A may operate or be associated with a computing device 185A, the entity 180B may operate or be associated with a computing device 185B, and the entity 180N may operate or be associated with a computing device 185N. In one embodiment, multiple ones of the computing devices 185A-185N may interact with the service provider environment 100 (e.g., with the IVR management component 120) in a substantially concurrent manner. Any of the computing devices 185A-185N may be implemented by the example computing device 3000 illustrated in FIG. 12.

As illustrated in FIG. 1, an external entity such as entity 180A may, via the entity's computing device 185A, register to have the entity's IVR data and processes managed by the cloud-based, voice-enabled IVR management component 120. To initiate the registration process, the computing device 185A may send a registration request 131 to an IVR registration component 130 of the IVR management component 120. In one embodiment, the request 131 may include suitable information associated with the entity 180A, such as a phone number at which the entity can be contacted, a name of the entity, an Internet domain name of the entity, and so on. In one embodiment, the entity 180A may already have an account with the service provider environment 100, and organizational information such as the phone number, entity name, and entity domain name may be derived from that existing account using an automated process. Such information may be referred to as entity-specific data 140, and the entity-specific data may be maintained in storage associated with the IVR management component 120. The entity-specific data 140 may include data associated with various entities 180A-180N that seek to have their IVR data and processed managed by the IVR management component 120.

In response to the request 131, the IVR registration component 130 may generate a certificate 132 that is specific to the entity 180A. The IVR registration component 130 may send the certificate 132 to the computing device 185A or to any other address or storage location at which the entity 180A expects to receive the certificate. The IVR registration component 130 may also store a copy of the certificate 132, e.g., in order to compare the stored copy with a copy retrieved from the entity 180A in the future. The certificate 132 may be implemented as a digital file that is digitally signed. In one embodiment, the certificate 132 may include information such as the name of the entity 180A, a serial number, expiration dates, a copy of the entity's public key, and/or the digital signature of the certificate-issuing authority (e.g., the organization that operates the cloud-based service provider environment 100 or a third party) so that a recipient (e.g., the IVR management component 120) can verify that the certificate is authentic. As will be discussed below, the certificate 132 may be used to verify ownership of the entity 180A and/or the validity of an IVR configuration associated with the entity. Upon verification of ownership of the entity 180A using the certificate 132, an IVR customization component 150 may customize an IVR configuration for the entity, potentially by modifying existing IVR configurations 160.

The computing devices 185A-185N may convey network-based service requests such as the registration request 131 to the service provider environment 100 (e.g., to the IVR management component 120) via a network 190 or other communication channel. In one embodiment, the network 190 may include one or more Wi-Fi networks or other types of wireless local area networks (WLANs). Such a network 190 may be implemented using any suitable wireless communication technologies and any suitable configuration of networking components, such as one or more wireless routers. In one embodiment, the network 190 may include one or more wired networks over a transmission medium such as Ethernet. In various embodiments, the network 190 may encompass any suitable combination of networking hardware and protocols necessary to establish network-based communications between the computing devices 185A-185N and components of the service provider environment 100. For example, the network 190 may generally encompass the various telecommunications networks and service providers that collectively implement the Internet. The network 190 may also include private networks such as local area networks (LANs) or wide area networks (WANs) as well as public or private wireless networks. In one embodiment, the network 190 may include the hardware (e.g., modems, routers, switches, load balancers, proxy servers, etc.) and software (e.g., protocol stacks, accounting software, firewall/security software, etc.) necessary to establish a networking link between two particular components. In one embodiment, one or more of the computing devices 185A-185N may be able to communicate with the service provider environment 100 using a private network rather than the public Internet.

Figure 12:
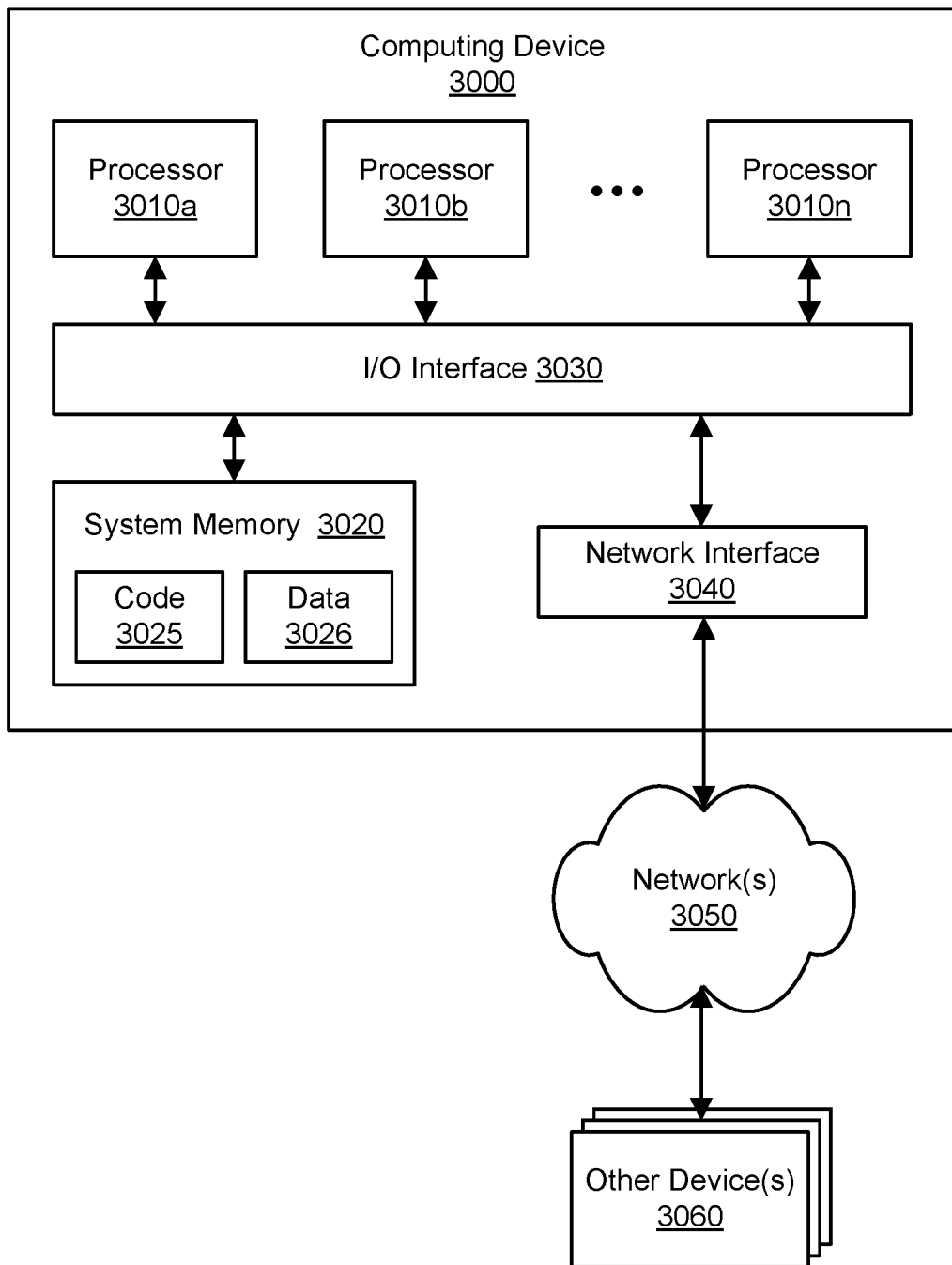
FIG. 12 illustrates an example computing device that may be used in some embodiments.

The service provider environment 100 may include a plurality of computing devices, any of which may be implemented by the example computing device 3000 illustrated in FIG. 12. In various embodiments, portions of the described components and functionalities of the service provider environment 100 may be provided by the same computing device or by any suitable number of different computing devices. If any of the components of the service provider environment 100 are implemented using different computing devices, then the components and their respective computing devices may be communicatively coupled, e.g., via the network 190. Each of the illustrated components may represent any combination of software and hardware usable to perform their respective functions. It is contemplated that the service provider environment 100, computing devices 185A-185N, and networking infrastructure 190 may include additional components not shown, fewer components than shown, or different combinations, configurations, or quantities of the components shown.

Figure 2:
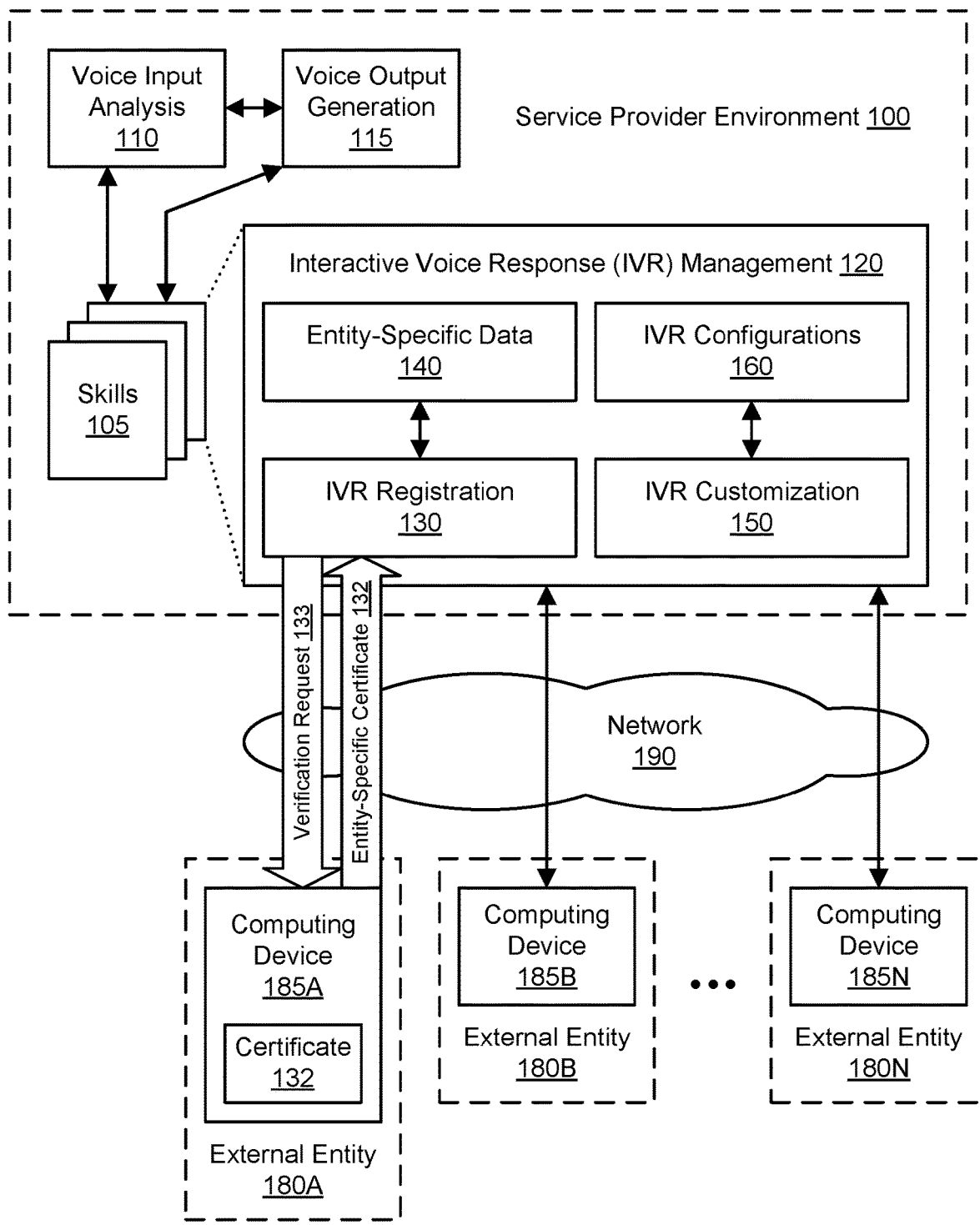
FIG. 2 illustrates further aspects of the example system environment for interactive voice response using a voice-enabled service, including verification of an entity by the IVR management component of the service provider environment, according to one embodiment.

FIG. 2 illustrates further aspects of the example system environment for interactive voice response using a voice-enabled service, including verification of an entity by the IVR management component of the service provider environment, according to one embodiment. As discussed above, the certificate 132 may be used to verify ownership of the entity 180A. After the certificate 132 has been provided to the entity 180A, the entity may store the certificate using storage associated with the computing device 185A or another specified storage location associated with the entity, e.g., as accessible by a uniform resource locator (URL) of the entity's website. In one embodiment, in order to verify the entity 180A for IVR management purposes, the IVR registration component 130 may issue a verification request 133 to the entity. The entity 180A may respond to the verification request 133 by providing the certificate 132 to the IVR registration component 130. The verification request 133 may represent a web-based request to obtain the certificate 132 at a particular URL associated with the entity 180A, and a web server associated with the entity may receive the request and reply by sending the certificate to the IVR registration component 130. Upon retrieving the certificate 132, the IVR registration component 130 may verify that the entity owns or is otherwise properly associated with the organizational name, domain name, phone number, and/or other entity-specific data 140 supplied in the registration request 131. If the entity cannot be verified in this automated manner, then a manual, out-of-band process may be used for verification and activation of IVR management. In one embodiment, a third-party verification service may be used to approve the entity for IVR management. In one embodiment, a domain name service may be used to verify ownership of the specified domain name by the entity. IVR management may then be approved for the entity 180A, as will be discussed below.

Figure 3:
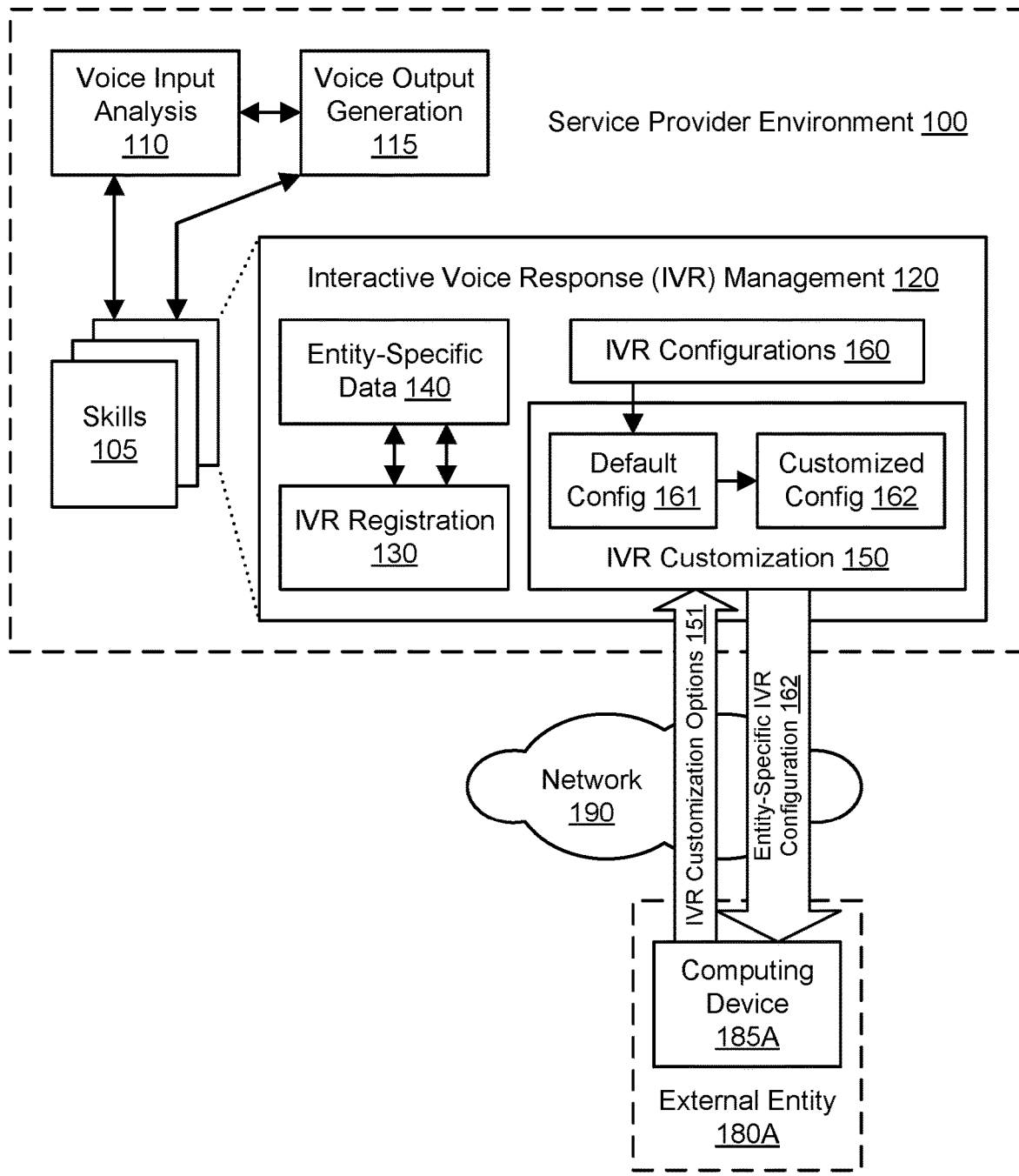
FIG. 3 illustrates further aspects of the example system environment for interactive voice response using a voice-enabled service, including entity-specific customization of a default IVR configuration, according to one embodiment.

FIG. 3 illustrates further aspects of the example system environment for interactive voice response using a voice-enabled service, including entity-specific customization of a default IVR configuration, according to one embodiment. Upon verification of ownership of the entity 180A using the certificate 132, the IVR customization component 150 may allow the entity to customize an IVR configuration. An IVR configuration may represent a structured menu of navigation options through which a user (e.g., of a voice-capturing device) may navigate (e.g., using voice input). An IVR configuration may be implemented using any suitable data structure. For example, an IVR configuration may take the form of an IVR tree with a root node, branch nodes, and leaf nodes organized in a hierarchical structure. An IVR configuration may represent terms (e.g., phrases) to be recited to the user by the voice output generation component 115, e.g., to ask questions of the user, recite menu options, or otherwise provide prompts for voice input. An IVR configuration may represent options for acceptable responses in the form of terms (e.g., words or phrases) represented in voice input, and those potential responses may represent transitions between navigation points. An IVR configuration may also represent contact points associated with an entity. The contact points may be included in leaf nodes of an IVR tree, such that navigation of the IVR tree based on voice input may proceed through one or more branch nodes before terminating in a leaf node that identifies a phone number or other value (e.g., a data store identifier or storage address) at which the entity may be contacted. Examples of IVR trees are discussed below with respect to FIG. 5 and FIG. 6. In one embodiment, IVR configurations may be implemented using an existing technology such as VoiceXML, JavaScript Object Notation (JSON) (or a format derived therefrom), or any other structured format or markup language suitable for expressing IVR menu options. In one embodiment, IVR configurations may be implemented using a structured format or markup language that is proprietary or internal to the IVR management component 120.

In one embodiment, an IVR configuration usable by the IVR management component 120 may include nodes or elements for acquiring relevant information without necessarily requiring voice input from the user after navigation of the IVR configuration has commenced. For example, prior to navigating the IVR configuration 162 based on voice input, the IVR configuration may retrieve a previously determined language preference associated with the user. The language preference may be retrieved from an account maintained in the service provider environment 100 and associated with the user and/or the user's device. As another example, prior to navigating the IVR configuration 162 based on voice input, the IVR configuration may retrieve an order history associated with the user. The order history may be retrieved from a component of the service provider environment or from a component of the external entity 180A, e.g., a data store associated with that entity. In this manner, the IVR management component 120 may reduce the amount of voice input or other real-time input required of the user for a particular session. The information collected without voice input may represent contextual information for an interaction (e.g., a phone call) with the entity. The contextual information may be used to navigate the IVR configuration, e.g., to choose one branch over another for a language preference. At least a portion of the contextual information may be provided to the entity, e.g., by the IVR management component 120 reciting the information at the beginning of a phone call to a customer service representative as initiated by the IVR management component.

In one embodiment, the set of existing IVR configurations 160 may include templates or default configurations for IVR processes. To set up navigable menu options for IVR, the entity 180A may modify a default IVR configuration or template. The entity 180A, via the computing device 185A, may provide input representing IVR customization options 151 to the IVR customization component 150. The IVR customization options 151 may include a selection of a template or default configuration 161 from the set of existing IVR configurations 160. The template or default configuration 161 may be selected based on the needs of the entity 180A. For example, if the entity 180A seeks to deploy a simple IVR solution with a minimal set of questions for the user, then a relatively simple template or default may be selected. An example of a simple IVR solution may be a prompt such as "Let me connect you to someone" and a single phone number at the entity to be called. However, if the entity 180A seeks to deploy a complex IVR solution with a more comprehensive set of questions for the user and/or a larger set of potential phone numbers to call, then a relatively complex template or default may be selected. In one embodiment, the template or default configuration 161 may be selected using a user-friendly, web-based graphical user interface (GUI), e.g., by displaying selectable configurations 160 in browser software on the computing device 185A. In one embodiment, the template or default configuration 161 may be selected using a call to an application programming interface (API) or other programmatic interface supported by the IVR customization component 150.

The IVR customization options 151 may include modifications to the selected default configuration 161. For example, the IVR customization options 151 may include entity-specific contact points such as phone numbers. As another example, the IVR customization options 151 may include entity-specific terms to be spoken to the user, such as different departments or organizational divisions within the entity to which the user can request access. The IVR customization options 151 may associate those departments with particular phone numbers. As a further example, the IVR customization options 151 may include terms to be detected in voice input, such as potential responses to questions posed to the user via voice output. As yet another example, the IVR customization options 151 may include options for collecting contextual information without voice input, e.g., by specifying a manner of acquiring a user's history or preferences from a data store associated with the entity 180A. In general, the IVR customization options 151 may specify any information usable for organizing and navigating an IVR tree or other data structure based (at least in part) on voice input from a user of a voice-capturing device. In one embodiment, the template or default configuration 161 may be modified using a user-friendly, web-based GUI, e.g., as displayed in browser software on the computing device 185A. In one embodiment, the template or default configuration 161 may be modified using a call to an API or other programmatic interface supported by the IVR customization component 150. Based (at least in part) on the IVR customization options 151 and the default configuration 161, the IVR customization component 150 may generate a customized IVR configuration 162 that is specific to the entity 180A. In one embodiment, the IVR customization component 150 may send the entity-specific IVR configuration 162 to the entity 180A, e.g., for storage in a location that is accessible to the IVR management component 120. In one embodiment, an API presented to the entity 180A may allow the entity to automatically update the customized configuration 162, potentially again and again at later points in time.

Figure 4:
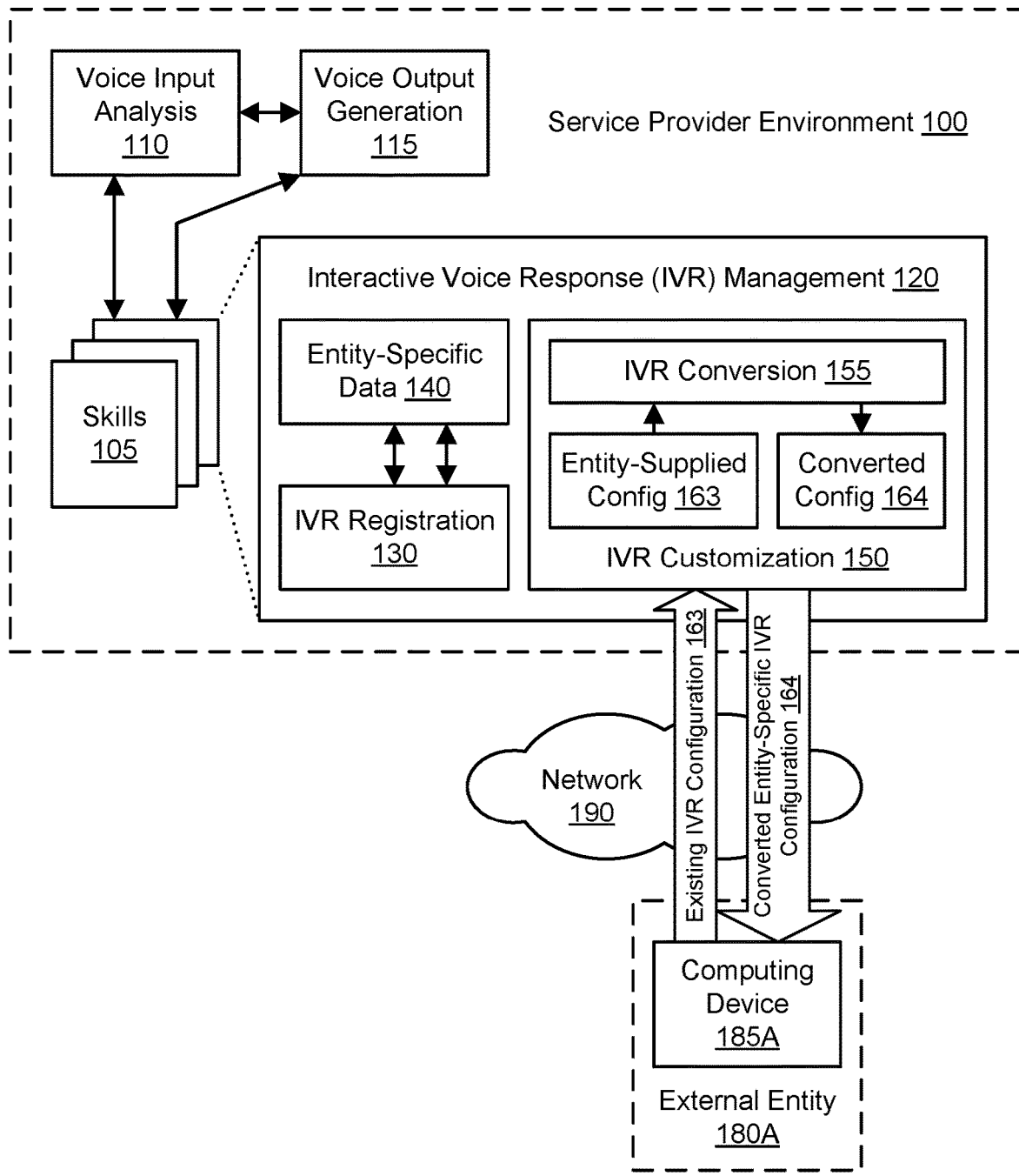
FIG. 4 illustrates further aspects of the example system environment for interactive voice response using a voice-enabled service, including conversion of an existing IVR configuration supplied by the entity, according to one embodiment.

FIG. 4 illustrates further aspects of the example system environment for interactive voice response using a voice-enabled service, including conversion of an existing IVR configuration supplied by the entity, according to one embodiment. To set up navigable menu options for IVR, the entity 180A may provide an existing IVR configuration 163 for conversion to an IVR data structure used by the service provider environment 100. The existing IVR configuration 163 may be expressed in a format such as VoiceXML or JSON. In one embodiment, the existing IVR configuration 163 may be provided using a user-friendly, web-based GUI, e.g., as displayed in browser software on the computing device 185A. In one embodiment, the existing IVR configuration 163 may be provided using a call to an API or other programmatic interface supported by the IVR customization component 150. Using an IVR conversion process 155, the IVR customization component 150 may transform the entity-supplied IVR configuration 163 into an IVR configuration 164 that is formatted for use with the IVR management component 120. In one embodiment, the IVR management component 120 may use a custom or proprietary format for IVR configurations, e.g., that differs in at least some respects from VoiceXML or JSON. The automated IVR conversion process 155 may transform the input configuration 163 in an industry-standard format into an output configuration in an internal format used by the IVR management component 120. In one embodiment, the IVR conversion process 155 may convert voice-based prompts into non-voice-based prompts to simplify the user experience. For example, the IVR conversion process 155 may convert a spoken prompt for a language preference into a non-voice-based step for determining a language preference as contextual information without real-time voice input. In this manner, external entities may easily deploy existing IVR solutions to the cloud-based, voice-enabled IVR management component 120.

After the entity 180A has provided or customized the IVR configuration, customers may activate traversal of that configuration with appropriate voice input using a voice-capturing device. The voice input may represent a request to speak to someone associated with the entity 180A, e.g., by naming the entity or naming a product offered by the entity. For example, the customer may speak a phrase such as "I'd like to order a pizza from [entity name]" or "I'd like to talk to someone about my [product name associated with entity] ." The IVR management component 120 may perform a lookup to find an IVR configuration for the entity that was referred to in the voice input. The IVR management component 120 may then begin traversing a hierarchy of voice prompts and potential responses based (at least in part) on voice input from the customer.

Figure 5:
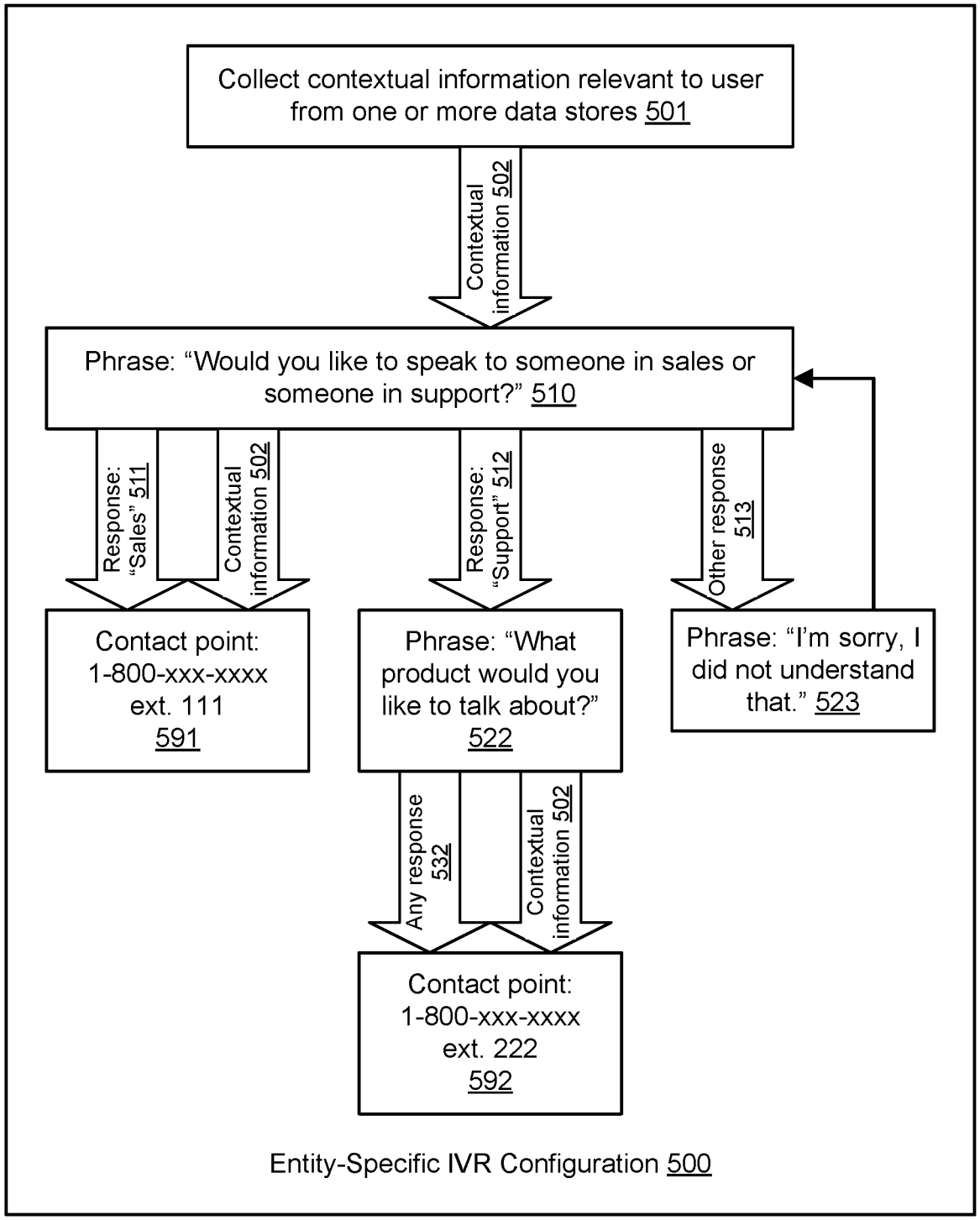
FIG. 5 illustrates an example of an entity-specific IVR configuration usable with the example system environment for interactive voice response, according to one embodiment.

FIG. 5 illustrates an example of an entity-specific IVR configuration usable with the example system environment for interactive voice response, according to one embodiment. In various embodiments, cloud-based IVR management may be employed for use cases such as calling a vendor for support regarding a product purchased from an online marketplace, calling a vendor to discuss potential purchases, and so on. The entity-specific IVR configuration 500 may represent a customization of a template or a version converted from an entity-supplied configuration. As discussed above, the IVR configuration 500 may include components for collecting contextual information without necessarily requiring real-time voice input from the user. Contextual information may be collected at the start of the IVR interaction, in the middle of the IVR interaction, or at the end of the IVR interaction. For example, a root node or top-level node 501 may specify one or more types of contextual information to be acquired from one or more data stores. A data store with contextual information may be internal to the service provider environment 100 or external and maintained by the entity associated with the IVR configuration 500. For example, the contextual information node 501 may acquire contextual information 502 such as a language preference of the user, a geographical region of the user, an order history (e.g., order numbers and details of recent orders), a customer service history for the user (e.g., a history of phone calls to the entity), and so on.

As discussed above, the IVR configuration 500 may also represent terms (e.g., phrases) to be recited to the user by the voice output generation component 115, e.g., to ask questions of the user, recite menu options, or otherwise provide prompts for voice input. For example, a node 510 may represent an initial phrase to be recited to a user who invokes IVR for the entity, such as "Would you like to speak to someone in sales or someone in support?" The IVR configuration 500 may represent options for acceptable responses in the form of terms (e.g., words or phrases) represented in voice input, and those potential responses may represent transitions between navigation points. For example, the node 510 may be associated with permissible responses such as "sales" 511 and "support" 512. The IVR configuration 500 may include a node 523 with a phrase such as "I'm sorry, I did not understand that" to be recited to the user when any response other than "sales" or "support" is detected in the voice response to the initial question 510. The IVR configuration 500 may repeat the initial question 510 if an impermissible response is received in voice input from the user. As also shown in the example of FIG. 5, the IVR configuration 500 may include an additional node 522 to be reached on receipt of the response "support," and the additional node may represent voice output of a phrase such as "What product would you like to talk about?" The IVR configuration 500 may also represent contact points associated with the entity. If "sales" 511 is received as a response to the initial question 510, then the IVR configuration may proceed to node 591 representing a particular phone number (1-800-xxx-xxxx, extension 111) associated with a customer service representative of the entity who can handle user inquiries concerning sales. In one embodiment, portions of the contextual information 502 may be provided to the person at the phone number, e.g., by reciting the contextual information as synthetic voice output at the outset of the phone call or by sending the contextual information using e-mail or a messaging system or programmatic interface to the entity.

According to the IVR configuration 500, any response to the phrase "What product would you like to talk about?" 522 may lead to a node 592 with a different contact point. The contact point 592 may represent a particular phone number (1-800-xxx-xxxx, extension 222) associated with a customer service representative of the entity who can handle user inquiries concerning support. In one embodiment, the response 532 may be provided to the customer service representative at the phone number 592, e.g., as recited to the representative when the call is placed by the IVR management component 120 or as converted to text and sent to the representative using some other channel (e.g., e-mail or another messaging system). In one embodiment, portions of the contextual information 502 may also be provided to the person at the phone number, e.g., by reciting the contextual information as synthetic voice output at the outset of the phone call or by sending the contextual information using e-mail or a messaging system or programmatic interface to the entity. Accordingly, the IVR configuration 500 may be used for gathering information from users prior to placing phone calls to the entity, in order to further delegate IVR tasks from the entity to the cloud-based, voice-enabled IVR management component 120.

Figure 6:
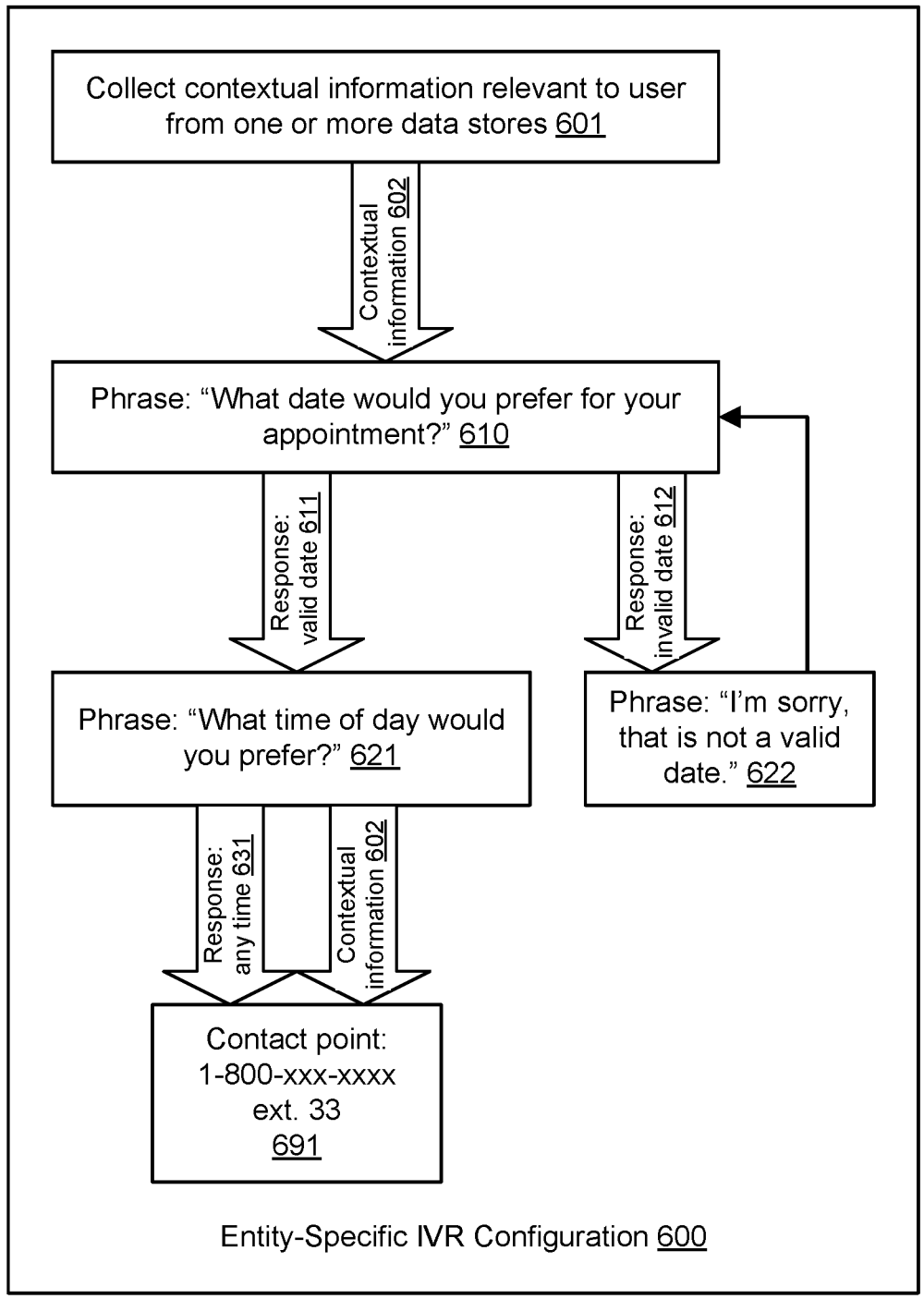
FIG. 6 illustrates an example of an entity-specific IVR configuration usable with the example system environment for interactive voice response, according to one embodiment.

FIG. 6 illustrates an example of an entity-specific IVR configuration usable with the example system environment for interactive voice response, according to one embodiment. In various embodiments, cloud-based IVR management may be employed for use cases such as scheduling medical appointments, scheduling service calls, scheduling tee times at golf courses, scheduling hotel rooms, scheduling airline flights, and other forms of customer service interaction that are often superior with a person-to-person connection. The entity-specific IVR configuration 600 may represent a customization of a template or a version converted from an entity-supplied configuration. As discussed above, the IVR configuration 600 may include one or more components such as node 601 for collecting contextual information 602 without necessarily requiring real-time voice input from the user. As discussed above, the IVR configuration 600 may also represent terms (e.g., phrases) to be recited to the user by the voice output generation component 115, e.g., to ask questions of the user, recite menu options, or otherwise provide prompts for voice input. For example, a node 610 may represent an initial phrase to be recited to a user who invokes IVR for the entity, such as "What date would you prefer for your appointment?" The IVR configuration 600 may represent options for acceptable responses in the form of terms (e.g., words or phrases) represented in voice input, and those potential responses may represent transitions between navigation points. For example, the node 610 may be associated with permissible responses representing valid dates 611. The IVR configuration 600 may include a node 622 with a phrase such as "I'm sorry, that is not a valid date" to be recited to the user when any response other than a valid date is detected in the voice response to the initial question 610. The IVR configuration 600 may repeat the initial question 610 if an impermissible response is received in voice input from the user.

As also shown in the example of FIG. 6, the IVR configuration 600 may include an additional node 621 to be reached on receipt of an answer with a valid date, and the additional node may represent voice output of a followup phrase such as "What time of day would you prefer?" According to the IVR configuration 600, any response to the phrase "What time of day would you prefer?" 621 may lead to a node 691 with a contact point. The contact point 691 may represent a particular phone number (1-800-xxx-xxxx, extension 33) associated with a customer service representative of the entity who can handle user inquiries concerning appointment scheduling. In one embodiment, the response 631 to the followup question 621 may be provided to the customer service representative at the phone number 691, e.g., as recited to the representative when the call is placed by the IVR management component 120 or as converted to text and sent to the representative using some other channel (e.g., e-mail or another messaging system). In one embodiment, portions of the contextual information 602 may be provided to the person at the phone number, e.g., by reciting the contextual information as synthetic voice output at the outset of the phone call or by sending the contextual information using e-mail or a messaging system or programmatic interface to the entity. Accordingly, the IVR configuration 600 may be used for gathering information from users prior to placing phone calls to the entity, in order to further delegate IVR tasks from the entity to the cloud-based, voice-enabled IVR management component 120.

Figure 7:
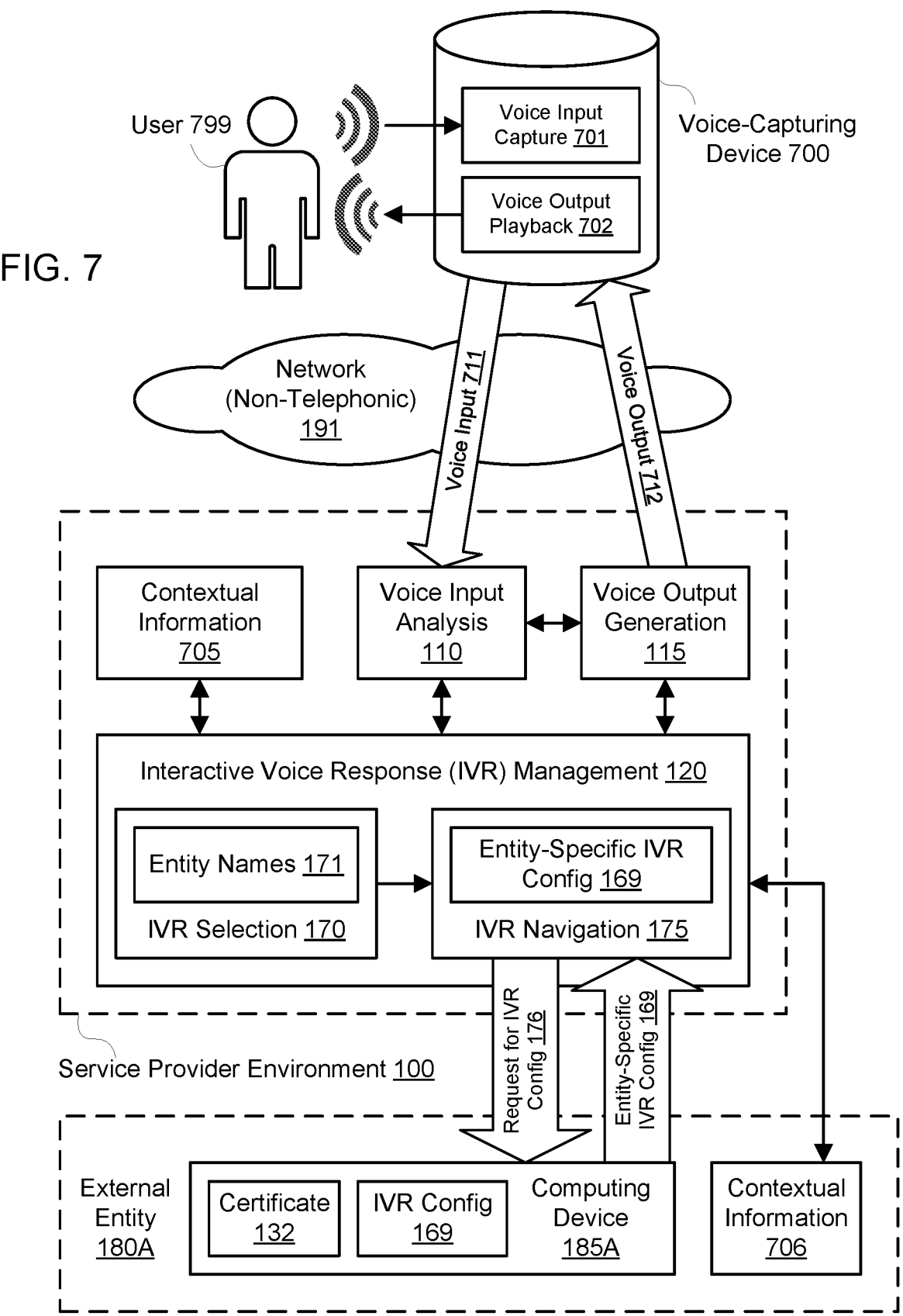
FIG. 7 illustrates further aspects of the example system environment for interactive voice response using a voice-enabled service, including selection and navigation of an entity-specific IVR configuration based (at least in part) on voice input received via a non-telephonic network, according to one embodiment.

FIG. 7 illustrates further aspects of the example system environment for interactive voice response using a voice-enabled service, including selection and navigation of an entity-specific IVR configuration based (at least in part) on voice input received via a non-telephonic network, according to one embodiment. A voice-capturing device 700 may stream or otherwise send voice input 711 to the voice-based service(s) provided by the service provider environment 100. In one embodiment, the voice capture may be prompted by detection of an audible "wake word" associated with the device 700, e.g., using voice input capture 701 (e.g., including one or more microphones or other audio detection components) to monitor audio in the vicinity of the device while the device is powered on and appropriately configured. In one embodiment, the voice input capture 701 may be prompted by a button press, a gesture, or another suitable user interaction instead of a wake word. In one embodiment, after the wake word or other user-supplied prompt is detected, the voice input capture 701 may continue to record (and the device 700 may continue to stream) audio input 711 until a pause of suitable duration is detected; until the voice-based service(s) instruct the device to stop; until a particular duration has been reached for the captured audio; or until a button press, gesture, or other suitable user interaction is received to end the voice capture.

In one embodiment, the voice input 711 may represent speech input from a user 799. The speech may include natural language speech. The voice input 711 may represent digital audio in any suitable format. The voice input 711 may be received and processed by the voice input analysis 110, e.g., by performing a speech-to-text operation to detect the presence of natural-languages terms in the input. In one embodiment, one or more of the terms may represent commands to invoke skills or functionalities that are enabled for the device 700 in the service provider environment 100. In one embodiment, one or more of the terms may represent data usable by skills or functionalities. In one embodiment, the same voice input 153 may include an invocation of a skill or functionality and also arguments or other data usable by that skill or functionality. For example, the voice input may represent a request to speak to someone associated with the entity 180A, e.g., by naming the entity or naming a product offered by the entity. Such a request may be interpreted by the voice input analysis component 110 as an invocation of a generic IVR skill (e.g., the IVR management component 120) with the entity name as input to the skill. For example, the customer may speak a phrase such as "I'd like to order a pizza from [entity name]," "Let me speak to Dr. Smith's office," or "I'd like to talk to someone about my [product name associated with entity]." The voice input analysis component 110 may detect the entity-specific information in the voice input. A component such as the IVR management component 120 may then perform a lookup to find an IVR configuration for the entity-specific information.

Based on the interpretation of the voice input 711 by the voice input analysis 110, the service provider environment 100 may invoke the IVR management component 120. An IVR selection component 170 may compare the user-supplied entity name (or product name) to a set of entity names 171 that are registered with the IVR management component 120. The IVR selection component 170 may attempt to perform a lookup of the user-supplied entity name (or product name) in the set of entity names 171. If a match cannot be found, or if multiple matches are found, then the IVR management component 120 may cause the voice output generation component 115 to ask the user for clarifying or disambiguating voice input. In addition or alternatively, other pieces of information may be used to disambiguate the response, such as contextual data about the user (e.g., the user's geographical location or history of contacting particular entities), contextual information about a user device like a mobile phone, contextual data about the entity (e.g., the entity's regions of operation to disambiguate regional entities with similar names), and so on. When a single match is found, the IVR management component 120 may retrieve the IVR configuration 169 specific to the matching entity, e.g., using an association between the entity name and the IVR configuration 169. The entity-specific IVR configuration 169 may represent the customized configuration 162 or the converted configuration 164. In one embodiment, the IVR management component 120 may retrieve the IVR configuration 169 from storage associated with the entity 180A. For example, the IVR management component 120 may send a request 176 for the IVR configuration to a web server or other computing device 185A associated with the entity 180A. In one embodiment, the IVR management component 120 may retrieve the entity-specific IVR configuration 169 and also retrieve the certificate 132 from the entity, e.g., from the entity's website. The IVR management component 120 may use the certificate to authenticate or validate the IVR configuration 169 also retrieved from the entity, e.g., from the same web domain. Upon retrieving the IVR configuration 169, the IVR management component 120 may perform IVR navigation 175 of that configuration. As discussed above, the IVR navigation 175 may include generating voice output 712 to prompt the user 799 for additional voice input 711 and traversing an IVR tree (or other data structure) based on the content of that voice input. In some circumstances, the IVR navigation may reach a leaf node or other terminal element that indicates a contact point, such as a phone number of a customer service representative associated with the entity.

In one embodiment, the IVR configuration 169 may include nodes or elements for acquiring contextual information without necessarily requiring voice input from the user after navigation of the IVR configuration has commenced. The contextual information collection may be implemented using suitable program code to be executed within the IVR management component 120 and/or using calls to an external program execution service. For example, the IVR navigation 175 may retrieve contextual information such as a previously determined language preference of the user, a geographical region of the user, an order history (e.g., order numbers and details of recent orders), a customer service history for the user (e.g., a history of phone calls to the entity), a schedule associated with the user, and so on. The contextual information may also be used for disambiguation of voice input 711, e.g., to clarify the name of the entity 180A. Contextual information 705 may be retrieved from an account maintained in the service provider environment 100 and associated with the user and/or the user's device. As another example, the IVR navigation 175 may retrieve contextual information such as an order history associated with the user or a set of available appointment times with the entity 180A. Contextual information 706 may be retrieved from a component from a component of the external entity 180A, e.g., a data store associated with that entity. In this manner, the IVR management component 120 may reduce the amount of voice input or other real-time input required of the user for a particular session. The contextual information 705 and/or 706 may be used to navigate the IVR configuration, e.g., to choose one branch over another for a language preference. At least a portion of the contextual information 705 and/or 706 may be provided to the entity 180A, e.g., by the IVR management component 120 reciting the information at the beginning of a phone call to a customer service representative as initiated by the IVR management component, or by specifying the information using a messaging system or programmatic interface to the entity.

Based (at least in part) on the voice input 711 and/or contextual information 705 and 706 as interpreted in the context of the IVR configuration 169, the service provider environment 100 may send voice output 712 back to the originating device 700 for playback on the device. Using a voice output generation component or service 115, the service provider environment 100 may generate audio output such as synthetic, computer-generated speech. The voice output 712 may represent terms (e.g., words or phrases) specified in the IVR configuration 169, e.g., as prompts for information from the user for navigation of an IVR data structure. In one embodiment, the device 700 may include or have access to a voice output playback component 701, including a speaker and/or other suitable audio-generating component(s), usable to play back audio output including computer-generated speech. In various embodiments, the voice output playback 701 may be located on board the device 700 or instead located in another device, such as a remote control. The service provider environment 100 may stream or otherwise send the voice output 712 to the device 700, and the device may play back the output for the user 799 using the voice output playback 702.

The voice-capturing device 700 may convey voice input to the service provider environment 100 and receive voice output from the environment via a non-telephonic network 191. In various embodiments, the non-telephonic network 191 may or may not include the public switched telephone network (PSTN). In various embodiments, the non-telephonic network 191 may or may not use voice over IP (VoIP) transmission techniques. In one embodiment, the network 191 may include one or more Wi-Fi networks or other types of wireless local area networks (WLANs). Such network(s) 191 may be implemented using any suitable wireless communication technologies and any suitable configuration of networking components, such as one or more wireless routers. In one embodiment, the network 191 may include one or more wired networks over a transmission medium such as Ethernet. In various embodiments, the network 191 may encompass any suitable combination of networking hardware and protocols necessary to establish network-based communications between the device 700 and components of the service provider environment 100. For example, the network 191 may generally encompass the various telecommunications networks and service providers that collectively implement the Internet. The network 191 may also include private networks such as local area networks (LANs) or wide area networks (WANs) as well as public or private wireless networks. In one embodiment, the network 191 may include the hardware (e.g., modems, routers, switches, load balancers, proxy servers, etc.) and software (e.g., protocol stacks, accounting software, firewall/security software, etc.) necessary to establish a networking link between two particular components. In one embodiment, the device 700 may be able to communicate with the service provider environment 100 using a private network rather than the public Internet. In one embodiment, the network 191 may include Bluetooth connections between components or other component-to-component connection functionality.

In one embodiment, the service provider environment 100 may maintain device-specific accounts for devices such as the device 700 using a device management component. In one embodiment, the device-specific accounts may be associated with device-specific account identifiers (e.g., e-mail addresses) and device-specific access credentials (e.g., passwords) permitting the devices to access the service provider environment. A device-specific account may also be used to maintain configuration information for a particular device, such as a set of skills that are enabled for the device, a "wake word" or other trigger to activate voice capture, and/or metadata associated with one or more users of the device. For example, the user metadata may include a user's full name, a user's street address, a user's e-mail address, a user's phone number, a user's time zone, a user's preferred language, a user's geographical region, user preferences for contacting or being contacted by entities 180A-180N, and so on. Portions of the configuration information, such as the wake word or other voice-capturing trigger, may also be stored on the device itself. In one embodiment, a device account may be distinct or independent from a personal account associated with the user of the corresponding device. For example, an e-mail address associated with the device account may belong to the service provider environment 100 and not the user and may be unknown to the user. In one embodiment, the device-specific accounts may be assigned to another "umbrella" account or a pool of accounts, such as a corporate account associated with an organizational customer of the service provider environment, e.g., for ease of device management. By separating the device-specific accounts from a user account, the registration and configuration of devices may be performed more efficiently and with greater flexibility. For example, the use of device-specific accounts may bypass a restriction on the number of devices that can be associated with a given user account.

Figure 8:
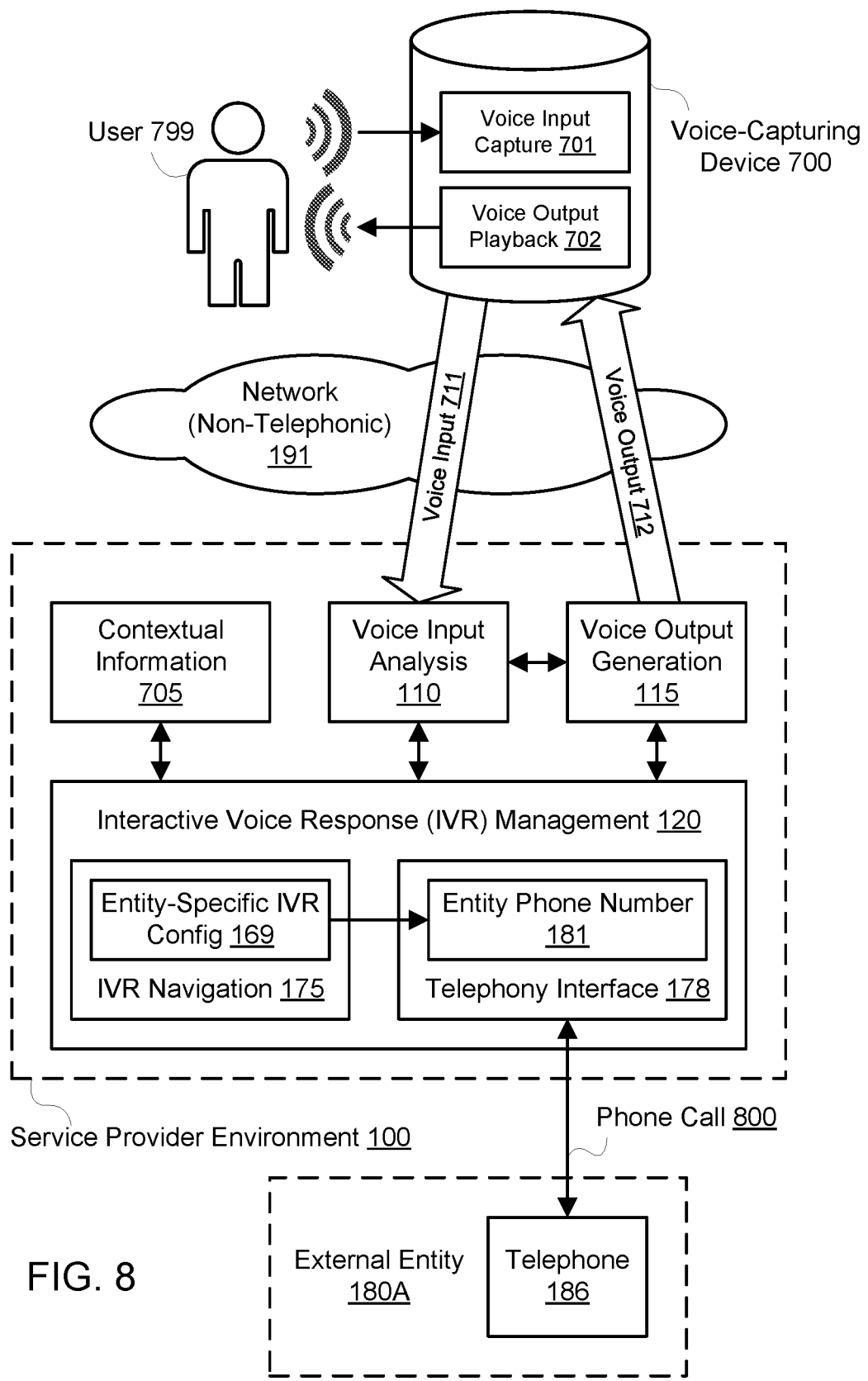
FIG. 8 illustrates further aspects of the example system environment for interactive voice response using a voice-enabled service, including placing a phone call to the entity as triggered by navigation of the entity-specific IVR configuration based (at least in part) on voice input received via a non-telephonic network, according to one embodiment.

FIG. 8 illustrates further aspects of the example system environment for interactive voice response using a voice-enabled service, including placing a phone call to the entity as triggered by navigation of the entity-specific IVR configuration based (at least in part) on voice input received via a non-telephonic network, according to one embodiment. As discussed above, the IVR navigation 175 may reach a leaf node or other terminal element that indicates a contact point, such as a phone number 181 of a customer service representative associated with the entity 180A. In one embodiment, the IVR management component 120 may include a telephony interface 178. In one embodiment, the telephony interface 178 may permit a phone call 800 to be placed over the public switched telephone network (PSTN) between the service provider environment 100 and a telephone 186 associated with the entity 180A and accessible by the phone number 181. In one embodiment, the telephony interface 178 may permit the phone call 800 to be placed using voice over IP (VoIP) transmission techniques between the service provider environment 100 and the telephone 186 accessible by the phone number 181. After placing the phone call 800, the service provider environment 100 may forward audio from the entity's telephone 186 to the voice-capturing device 700 (over the non-telephonic network 191, as voice output 712) for playback 702 on the device. Similarly, the service provider environment 100 may forward audio captured by the voice-capturing device 700 (over the non-telephonic network 191, as voice input 711) to the entity's telephone 186. In this manner, the IVR management component 120 may broker phone calls between users of voice-capturing devices and entities 180A-180N via a non-telephonic network 191. In one embodiment, after the phone call is over, the voice input analysis 100 may resume analyzing any voice input 711 for potential invocation of skills 105.

In one embodiment, information gathered during the IVR navigation 175 may be provided to the entity 180A, e.g., by reciting the gathered information at the beginning of the phone call 800 or by converting it to text and sending it to the entity 180A using another transmission medium (e.g., e-mail, a messaging system, or a programmatic interface). The gathered information may include requested dates and times of appointments, product names, product identifiers, and other information that may be useful in providing assistance to the user 799. In one embodiment, the gathered information may include contextual information 705 and/or 706 that was collected without real-time voice input 711 from the user 799. In one embodiment, user-centric information such as the user's name, phone number, e-mail address, street address, geographical region, language preference, product registration data, customer service history, and so on may be obtained from a user-specific or device-specific account maintained by the service provider environment 100 and also provided to the entity 180A in association with the phone call 800.

In one embodiment, the phone call 800 may be implemented over a non-telephonic interface between the user 799 and the entity 180A. In one embodiment, brokering the phone call may include prompting the user's phone or other audio-capable device to call the entity's phone number 181. In one embodiment, rather than brokering the phone call 800 between the voice-capturing device 700 and the entity's telephone 186, the IVR management component 120 may send a request to the entity 180A for someone to call a phone number associated with the user 799. The user's phone number may be retrieved from a user-specific or device-specific account maintained by the service provider environment 100. In one embodiment, the IVR management component 120 may maintain a queue of phone calls between users and the entity 180A. When a user's request to contact the entity 180A is queued, the IVR management component 120 may produce voice output informing the user that the call has been queued. When the phone number 181 is available for the user's call, the IVR management component 120 may ask the user if the user still wishes to speak to someone at the entity. In this manner, queuing of phone calls may be delegated from an entity to the cloud-based, voice-enabled IVR management component 120.

Figure 9:
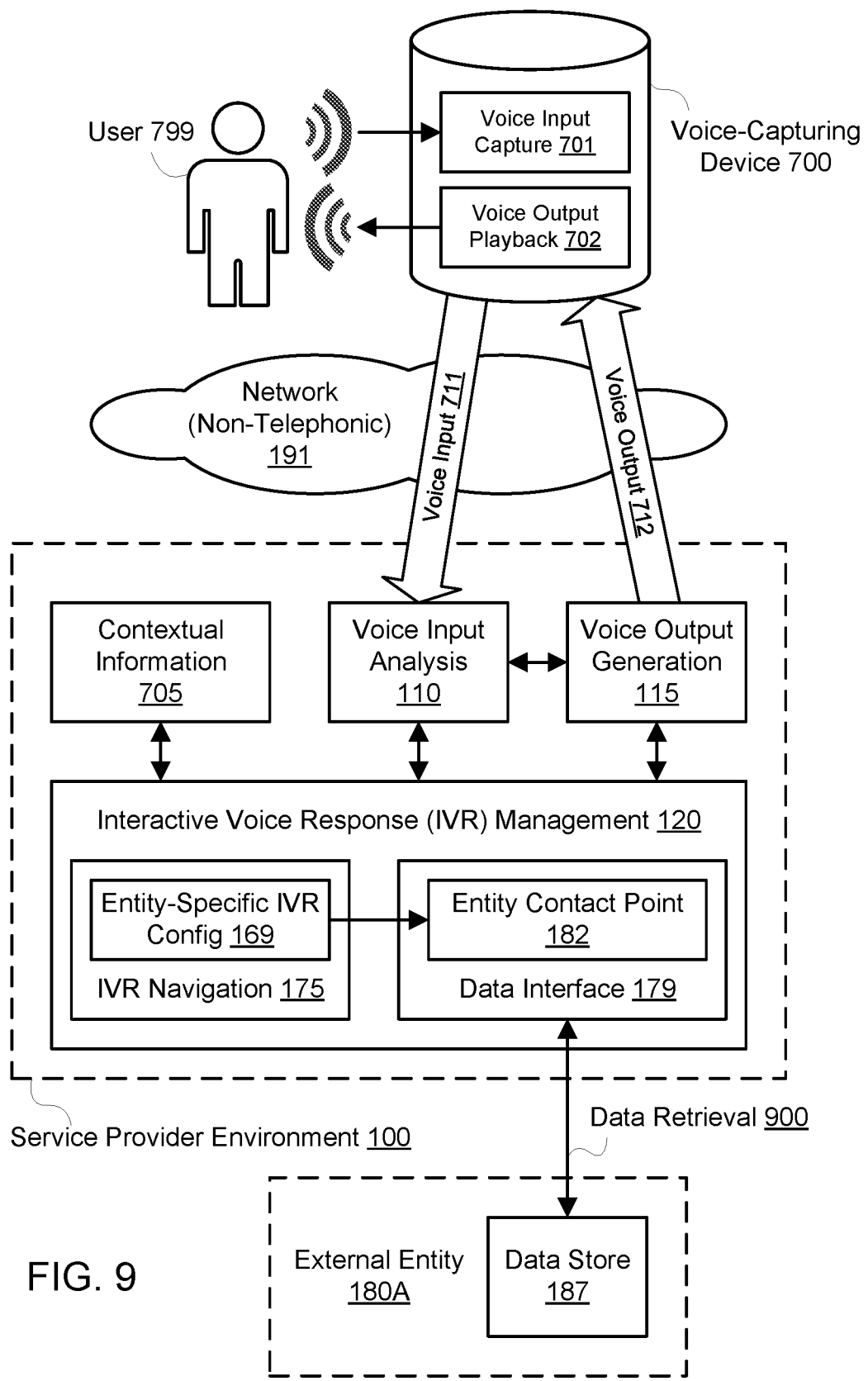
FIG. 9 illustrates further aspects of the example system environment for interactive voice response using a voice-enabled service, including retrieving data from the entity as triggered by navigation of the entity-specific IVR configuration based (at least in part) on voice input received via a non-telephonic network, according to one embodiment.

FIG. 9 illustrates further aspects of the example system environment for interactive voice response using a voice-enabled service, including retrieving data from the entity as triggered by navigation of the entity-specific IVR configuration based (at least in part) on voice input received via a non-telephonic network, according to one embodiment. As discussed above, the IVR navigation 175 may reach a leaf node or other terminal element that indicates a contact point 182, such as an address or identifier of a data store 187 or other storage location associated with the entity 180A. In one embodiment, the IVR management component 120 may include a data interface 179. In one embodiment, the data interface 179 may permit the IVR management component 120 to perform a data retrieval operation 900 involving the data store 187. For example, if the user's request involves obtaining aspects of the user's account information from the entity, then the data retrieval 900 may use an appropriate interface 179 to obtain the requested information and cause voice output 712 to be produced reciting the requested information.

Figure 10:
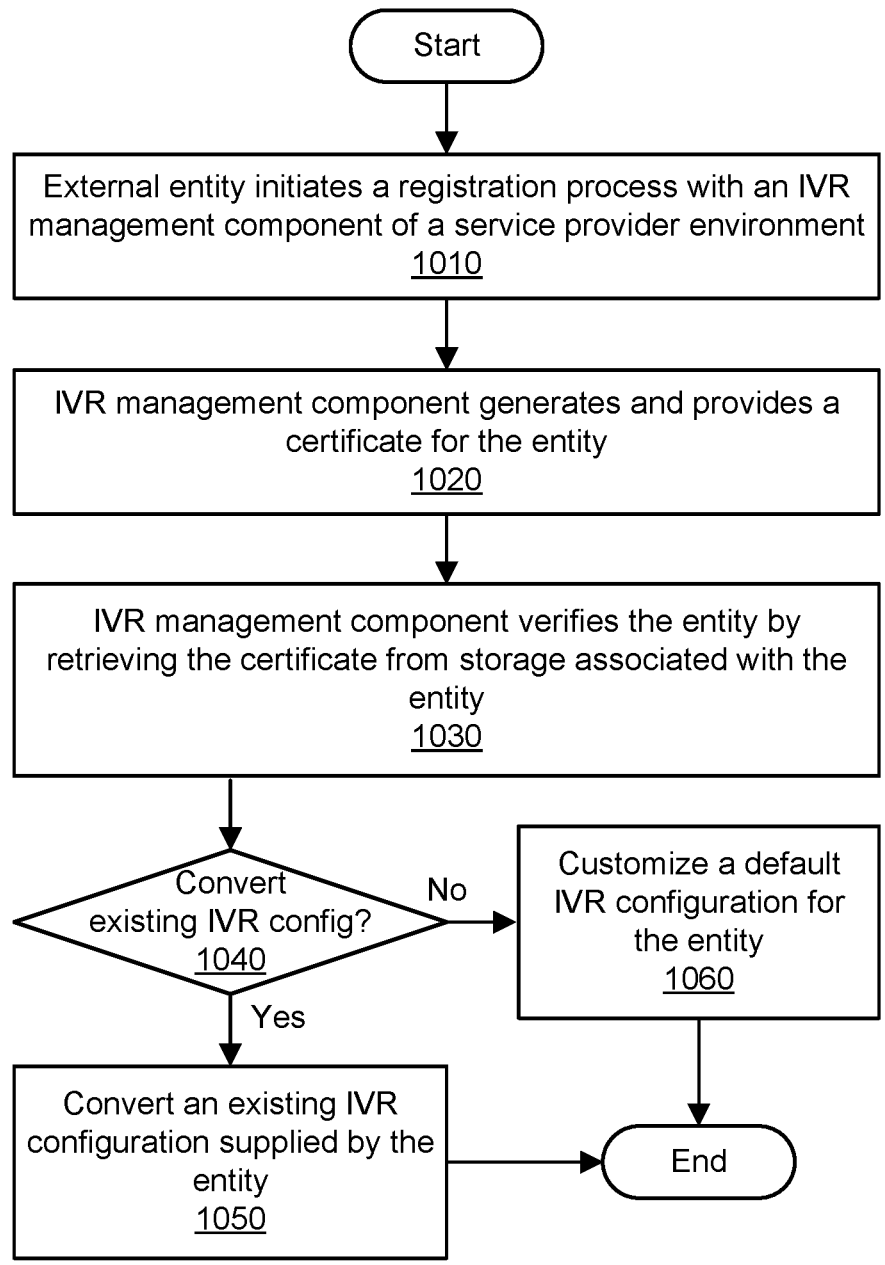
FIG. 10 is a flowchart illustrating a method for interactive voice response using a voice-enabled service, including registration by an entity and entity-specific customization of an IVR configuration, according to one embodiment.

FIG. 10 is a flowchart illustrating a method for interactive voice response using a voice-enabled service, including registration by an entity and entity-specific customization of an IVR configuration, according to one embodiment. As shown in 1010, an external entity may initiate a registration process with an IVR management component of a service provider environment. To initiate the registration process, the entity may send a registration request to the IVR management component. In one embodiment, the request may include suitable information associated with the entity, such as a phone number at which the entity can be contacted, a name of the entity, an Internet domain name of the entity, and so on. For example, a regional pizza restaurant named Robert's Pizza Kitchen may supply the name "Robert's Pizza Kitchen," the Internet domain name robertspizzakitchen.com, and a city or metro area in which the restaurant delivers to customers. In one embodiment, the entity may already have an account with the service provider environment, and organizational information such as the phone number, entity name, and entity domain name may be derived from that existing account using an automated process.

As shown in 1020, the IVR management component may generate and provide a certificate for the entity. The IVR management component may send the certificate to any address or storage location at which the entity expects to receive the certificate. The certificate may be implemented as a digital file such as a public key certificate. In one embodiment, the certificate may include information such as the name of the entity, a serial number, expiration dates, a copy of the entity's public key, and the digital signature of the certificate-issuing authority (e.g., the organization that operates the cloud-based service provider environment) so that a recipient (e.g., the IVR management component) can later verify that the certificate is authentic.

As shown in 1030, the IVR management component may verify the entity by retrieving the certificate from storage associated with the entity. After the certificate has been provided to the entity, the entity may store the certificate using storage associated with the entity, such as a uniform resource locator (URL) of the entity's website. In one embodiment, in order to verify the entity for IVR management purposes, the IVR management component may issue a verification request to the entity. The entity may respond to the verification request by providing the certificate to the IVR management component. The verification request may represent a web-based request to obtain the certificate at a particular URL associated with the entity, and a web server associated with the entity may receive the request and reply by sending the certificate to the IVR management component. Upon retrieving the certificate, the IVR management component may verify that the entity owns the organizational name, domain name, and/or other entity-specific data supplied in the registration request. The verification may avoid the possibility of an imposter hijacking the entity's name with the cloud-based IVR management component. If the entity cannot be verified in this automated manner, then a manual, out-of-band process may be used for verification and activation of IVR management. Cloud-based IVR management may then be approved for the entity.

As shown in 1040, the method may determine whether the entity has an existing IVR configuration to convert. For example, in a user interface presented to the entity, an administrator associated with the entity may accept or decline an offer to upload an existing IVR configuration. If the entity supplies an existing IVR configuration to convert, then as shown in 1050, the existing IVR configuration may be converted (e.g., from VoiceXML or JSON) to a format usable by the IVR management component for IVR management on behalf of the entity. If not, then as shown in 1060, a default IVR configuration or template may be customized for IVR management on behalf of the entity. IVR customization options provided by the entity may include a selection of a template or default configuration from a set of existing IVR configurations, plus customizations such as phone numbers, prompts to the user, and acceptable responses to the prompts.

Figure 11:
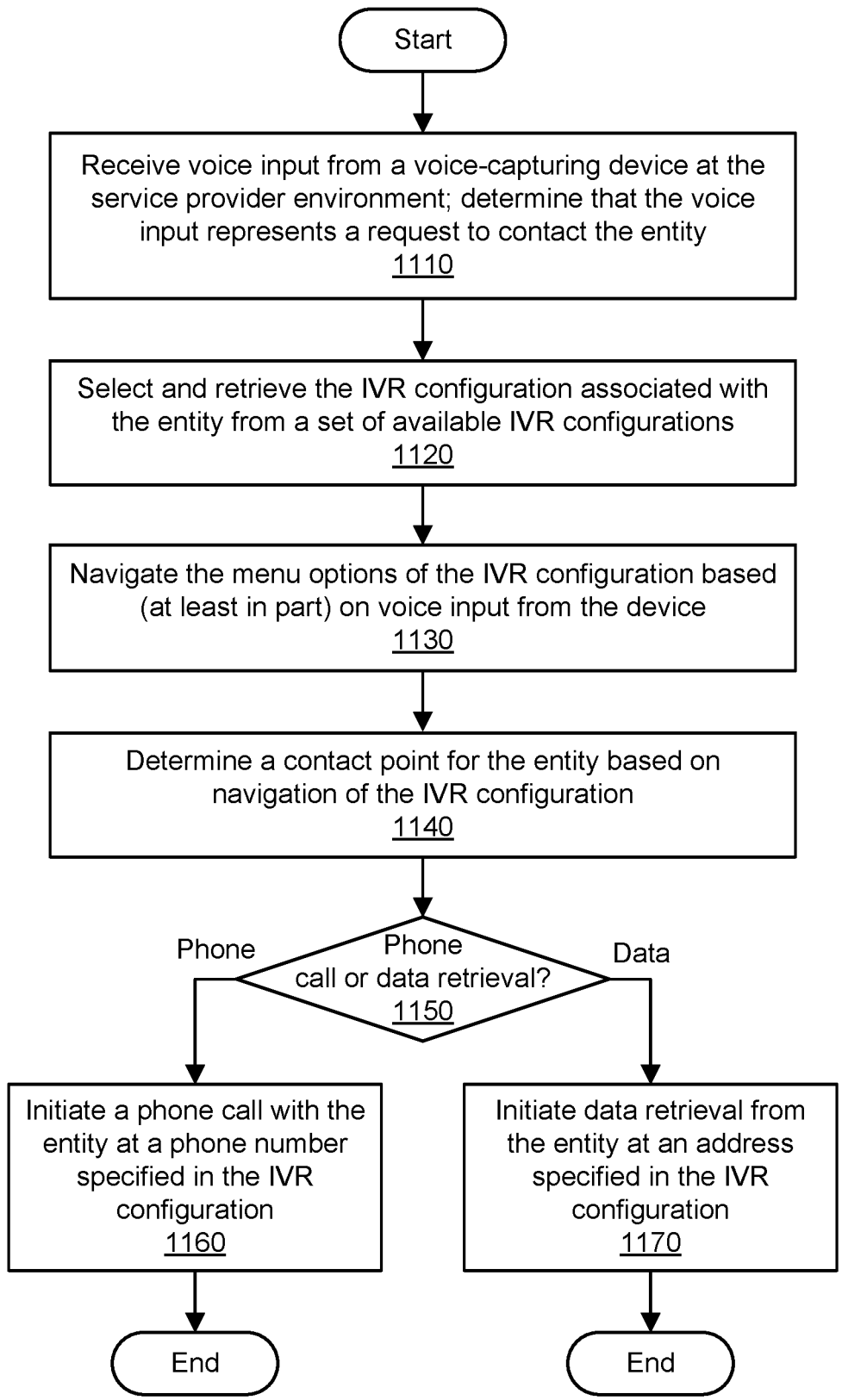
FIG. 11 is a flowchart illustrating a method for interactive voice response using a voice-enabled service, including navigation of an entity-specific IVR configuration using voice input received at a service provider environment via a non-telephonic network, according to one embodiment.

FIG. 11 is a flowchart illustrating a method for interactive voice response using a voice-enabled service, including navigation of an entity-specific IVR configuration using voice input received at a service provider environment via a non-telephonic network, according to one embodiment. As shown in 1110, voice input from a voice-capturing device may be received at the service provider environment. The voice input may be received via a non-telephonic network. Analysis of the voice input by the service provider environment may determine that the voice input represents a request to contact a particular entity. For example, in conjunction with voice input such as "I'd like to talk to someone at [entity name]," the service provider environment may detect the name of the entity. As another example, in conjunction with voice input such as "I'd like to talk to someone about my [product name]," the service provider environment may detect the name of the product and determine that the product is offered by a particular entity, e.g., by referencing information about product names provided by the entity. In one embodiment, IVR management may be enabled for individual sellers in an online marketplace, such that voice input representing a request to talk to a seller while on a product page or seller-specific page may cause the IVR management to be invoked to contact that seller.

As shown in 1120, an IVR configuration associated with the entity may be selected. The IVR configuration may be retrieved from a set of available IVR configurations. In one embodiment, the set of available IVR configurations may be maintained within the service provider environment. In one embodiment, the set of available IVR configurations may be maintained in a distributed manner by numerous entities that are registered with the IVR management component. For example, to retrieve the IVR configuration, the IVR management component may go to a specific URL associated with the entity and retrieve the entity-specific IVR configuration. In one embodiment, the entity's certificate may also be retrieved in order to verify the IVR configuration.

As shown in 1130, the menu options of the entity-specific IVR configuration may be navigated based on voice input from the voice-capturing device. The IVR configuration may represent a structured menu of navigation options through which the user of the voice-capturing device may navigate using voice input. The IVR configuration may be implemented using any suitable data structure. For example, the IVR configuration may take the form of an IVR tree with a root node, branch nodes, and leaf nodes organized in a hierarchical structure. The IVR configuration may represent terms (e.g., phrases) to be recited to the user by the voice output generation component 115, e.g., to ask questions of the user, recite menu options, or otherwise provide prompts for voice input. The IVR configuration may represent options for acceptable responses in the form of terms (e.g., words or phrases) represented in voice input, and those potential responses may represent transitions between navigation points. The IVR configuration may also represent contact points associated with an entity.

As shown in 1140, a contact point for the entity may be determined based on the navigation of the IVR configuration. The contact point may be indicated in a leaf node or other terminal point in the IVR configuration. The contact point may represent a phone number or a storage address (e.g., of a data store). As shown in 1150, the method may determine, based on the nature of the contact point, whether to place a phone call with the entity or perform data retrieval from the entity. As shown in 1160, the service provider environment may initiate a phone call with the entity at the phone number specified in the entity-specific IVR configuration. In one embodiment, initiating the phone call may include brokering a phone call between the voice-capturing device and the entity's phone number, e.g., by sending audio of the phone call across a non-telephonic connection between the service provider environment and the voice-capturing device. In one embodiment, initiating the phone call may include asking the entity (e.g., a customer service representative at the phone number) to call the user's phone number. In one embodiment, initiating the phone call may include queuing the phone call within the service provider environment. As shown in 1170, the service provider environment may instead initiate data retrieval from the entity at the contact point specified in the entity-specific IVR configuration.

Illustrative Computer System

In at least some embodiments, a computer system that implements a portion or all of one or more of the technologies described herein may include a computer system that includes or is configured to access one or more computer-readable media. FIG. 12 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices implementing one or more voice-enabled services in a service provider environment, wherein the one or more voice-enabled services comprise a voice input analysis component and an interactive voice response (IVR) component; and
   a voice-capturing device, wherein the voice-capturing device sends voice input to the service provider environment over a non-telephonic network; and
   wherein the one or more voice-enabled services are executable by the one or more computing devices to:
   generate an IVR tree usable to perform IVR navigation, wherein the IVR tree is generated based at least in part on input from an entity, and wherein the IVR tree comprises a plurality of leaf nodes representing a plurality of contact points associated with the entity;
   select the IVR tree from a set of available IVR trees based at least in part on analysis of the voice input, wherein at least some of the set of available IVR trees are associated with additional entities;
   navigate the IVR tree based at least in part on contextual information input associated with a user of the voice-capturing device and retrieved from one or more data stores; and
   place a phone call between the service provider environment and a phone number associated with a leaf node selected in navigating the IVR tree, wherein audio of the phone call is sent between the service provider environment and the voice-capturing device.

2. The system as recited in claim 1, wherein the IVR tree is generated using conversion of an IVR configuration provided by the entity.

3. The system as recited in claim 1, wherein the IVR tree is generated using customization of a default configuration based at least in part on the input from the entity.

4. The system as recited in claim 3, wherein the one or more voice-enabled services are further executable by the one or more computing devices to:
   navigate the IVR tree based at least in part on analysis of additional voice input in the service provider environment.

5. A computer-implemented method, comprising:
   generating, at a service provider environment, a data structure usable to perform Interactive Voice Response (IVR) navigation, wherein the data structure is generated based at least in part on input from an entity, and wherein the data structure comprises one or more options associated with contacting the entity;
   selecting the data structure based at least in part on analysis of voice input by the service provider environment, wherein the voice input is sent from a voice-capturing device to the service provider environment via a non-telephonic network;
   selecting a contact point from the data structure based at least in part on contextual information input associated with a user of the voice-capturing device and retrieved from one or more data stores; and
   initiating a connection with the contact point.

6. The method as recited in claim 5, wherein the contact point comprises a phone number, wherein initiating the connection comprises placing a phone call between the service provider environment and the phone number, and wherein audio of the phone call is sent between the service provider environment and the voice-capturing device.

7. The method as recited in claim 5, wherein the contact point comprises a phone number associated with the entity, and wherein initiating the connection comprises prompting a phone call from the phone number associated with the entity to a phone number associated with the user of the voice-capturing device.

8. The method as recited in claim 5, wherein the contact point comprises a phone number, and wherein initiating the connection comprises queuing, in the service provider environment, a phone call to the phone number.

9. The method as recited in claim 5, wherein the contact point comprises a data store, wherein initiating the connection comprises retrieving data from the data store, and wherein audio associated with the data is sent from the service provider environment to the voice-capturing device and played on the voice-capturing device.

10. The method as recited in claim 5, further comprising:
    generating a certificate associated with the entity; and
    verifying authenticity of the data structure using the certificate.

11. The method as recited in claim 5, wherein the data structure is generated using conversion of an IVR configuration provided by the entity.

12. The method as recited in claim 5, wherein the data structure tree is generated using customization of a default configuration based at least in part on the input from the entity.

13. The method as recited in claim 5, further comprising:
    navigating the data structure based at least in part on analysis of additional voice input in the service provider environment.

14. The method as recited in claim 5, wherein the one or more data stores are stored by the service provider environment.

15. The method as recited in claim 5, wherein the one or more data stores are stored by the entity.

16. One or more non-transitory computer-readable storage media storing program instructions that, when executed on or across one or more processors, perform:
    generating, at a service provider environment, an interactive voice response (IVR) configuration, wherein the IVR configuration is generated based at least in part on input from an entity, and wherein the IVR configuration comprises one or more options associated with contacting the entity;
    selecting the IVR configuration from a set of available IVR configurations based at least in part on analysis of voice input by the service provider environment, wherein the voice input is sent from a voice-capturing device to the service provider environment via a non-telephonic network, and wherein at least some of the set of available IVR configurations are associated with additional entities;
    selecting a phone number in the IVR configuration based at least in part on contextual information input associated with a user of the voice-capturing device and retrieved from one or more data stores; and
    initiating a phone call between the service provider environment and the phone number, wherein audio of the phone call is sent between the service provider environment and the voice-capturing device.

17. The one or more non-transitory computer-readable storage media as recited in claim 16, further comprising additional program instructions that, when executed on or across the one or more processors, perform:
    generating a certificate associated with the entity; and
    verifying authenticity of the IVR configuration using the certificate.

18. The one or more non-transitory computer-readable storage media as recited in claim 16, wherein the IVR configuration is generated using conversion of an input IVR configuration provided by the entity.

19. The one or more non-transitory computer-readable storage media as recited in claim 16, wherein the IVR configuration is generated using customization of a default IVR configuration based at least in part on the input from the entity to the service provider environment, wherein the input comprises the phone number associated with the entity.

20. The one or more non-transitory computer-readable storage media as recited in claim 19, wherein the input from the entity comprises a plurality of terms representing navigation options in the IVR configuration.

* * * * *